US008356419B2

(12) United States Patent
Lord

(10) Patent No.: US 8,356,419 B2
(45) Date of Patent: Jan. 22, 2013

(54) DIGITAL MEASURING DEVICE

(76) Inventor: Peter Maxwell Lord, New York, NY (US)

( * ) Notice: Subject to any disclaimer, the term of this patent is extended or adjusted under 35 U.S.C. 154(b) by 231 days.

(21) Appl. No.: 12/762,311

(22) Filed: Apr. 17, 2010

(65) Prior Publication Data
US 2010/0275456 A1 Nov. 4, 2010

Related U.S. Application Data

(60) Provisional application No. 61/173,636, filed on Apr. 29, 2009.

(51) Int. Cl.
G01B 3/10 (2006.01)
(52) U.S. Cl. .................. 33/756; 33/758; 33/763; 33/770
(58) Field of Classification Search .................... 33/755, 33/756, 758, 759, 760, 761, 762, 763, 770, 33/771; 377/18
See application file for complete search history.

(56) References Cited

U.S. PATENT DOCUMENTS

| | | | |
|---|---|---|---|
| 1,102,436 A * | 7/1914 | Richardson | 33/770 |
| 1,439,645 A * | 12/1922 | Sell | 411/439 |
| 2,686,366 A * | 8/1954 | Berkovic | 33/758 |
| 2,711,030 A * | 6/1955 | Drew et al. | 33/758 |
| D245,071 S | 7/1977 | Kong | |
| 4,161,781 A | 7/1979 | Hildebrandt et al. | |
| 4,186,490 A | 2/1980 | Quenot | |
| 4,195,348 A | 3/1980 | Kakutani | |
| 4,296,554 A | 10/1981 | Hammerstrom | |
| 4,305,206 A * | 12/1981 | Roe | 33/770 |
| 4,316,081 A | 2/1982 | Washizuka et al. | |
| 4,730,190 A | 3/1988 | Win et al. | |
| 4,747,215 A | 5/1988 | Waikas | |
| 4,768,290 A | 9/1988 | Cooper | |
| 4,890,392 A | 1/1990 | Komura et al. | |
| 4,977,524 A * | 12/1990 | Strege et al. | 700/279 |
| 5,286,972 A | 2/1994 | Falk et al. | |
| 5,386,643 A | 2/1995 | Corcoran | |
| 5,396,578 A | 3/1995 | Howes | |
| 5,426,863 A | 6/1995 | Biggel | |

(Continued)

FOREIGN PATENT DOCUMENTS

GB 2309084 A * 7/1997

(Continued)

OTHER PUBLICATIONS

Digital Measuring Tape, Gadget Venue, Feb. 1, 2008.

(Continued)

Primary Examiner — R. A. Smith
(74) Attorney, Agent, or Firm — Robert Platt Bell

(57) ABSTRACT

A measuring device measures distances via a thin retractable wire with a removable head. Distance is calculated and displayed on a very bright, large LED or other type screen. As the wire is extended, a microprocessor calculates the distance and displays it on its screen. The digital measuring device comprises a housing, a very thin extendable wire, cable or tape, a rotating spool, (from which the wire extends then automatically retracts to), a sensor which measures the amount of wire extended, a microprocessor, a tiny flash drive or other type of memory storage, a microphone/speaker, a large (size of unit) mono or duo chromatic or other type of display screen (LED) and a few buttons and/or a menu driven interface which control functionally. A plurality of removable heads may be attached to the wire for performing different measuring functions.

18 Claims, 13 Drawing Sheets

U.S. PATENT DOCUMENTS

| | | | |
|---|---|---|---|
| 5,433,014 A | 7/1995 | Falk et al. | |
| 5,802,732 A | 9/1998 | Malone | |
| 6,370,790 B1 * | 4/2002 | Stenger | 33/758 |
| 6,427,358 B1 * | 8/2002 | LeBon et al. | 33/758 |
| 6,546,644 B2 * | 4/2003 | Poineau et al. | 33/758 |
| 6,658,755 B2 | 12/2003 | Arlinsky | |
| 6,663,153 B2 * | 12/2003 | Brunson | 294/65.5 |
| 6,868,620 B2 | 3/2005 | Sanoner | |
| 6,928,029 B2 | 8/2005 | Rickman | |
| 6,931,753 B2 * | 8/2005 | Ryals et al. | 33/758 |
| 7,363,723 B1 | 4/2008 | Peterson | |
| 7,370,433 B1 | 5/2008 | Caraway | |
| 7,401,416 B2 | 7/2008 | Brooks | |
| 7,434,330 B2 * | 10/2008 | McEwan et al. | 33/770 |
| 7,676,949 B1 * | 3/2010 | Lungu et al. | 33/770 |
| 7,870,679 B2 * | 1/2011 | Lee et al. | 33/770 |
| 8,020,312 B1 * | 9/2011 | McGahan | 33/770 |
| 2002/0011008 A1 * | 1/2002 | Nelson et al. | 33/770 |
| 2008/0060210 A1 * | 3/2008 | Trout et al. | 33/773 |
| 2008/0072446 A1 | 3/2008 | Hu | |
| 2010/0198543 A1 * | 8/2010 | Teune | 702/95 |
| 2011/0179662 A1 * | 7/2011 | Donovan et al. | 33/758 |

FOREIGN PATENT DOCUMENTS

| | | |
|---|---|---|
| JP | 56096297 | 8/1981 |
| JP | 59225302 A * | 12/1984 |
| JP | 2005083822 A * | 3/2005 |

OTHER PUBLICATIONS

Ryobi SW106S Digital Tape Measure, DIY Tools, as printed from the website on Oct. 27, 2008.

Voice Recording Tape Measure, RehabMart, as printed from the website on Oct. 27, 2008.

Stanley 77-008 IntelliTape Digital Tape Rule, amazon.com, as printed from the website on Oct. 27, 2008.

Digital Tape Measure, Our House, as printed from the website on Oct. 27, 2008.

* cited by examiner

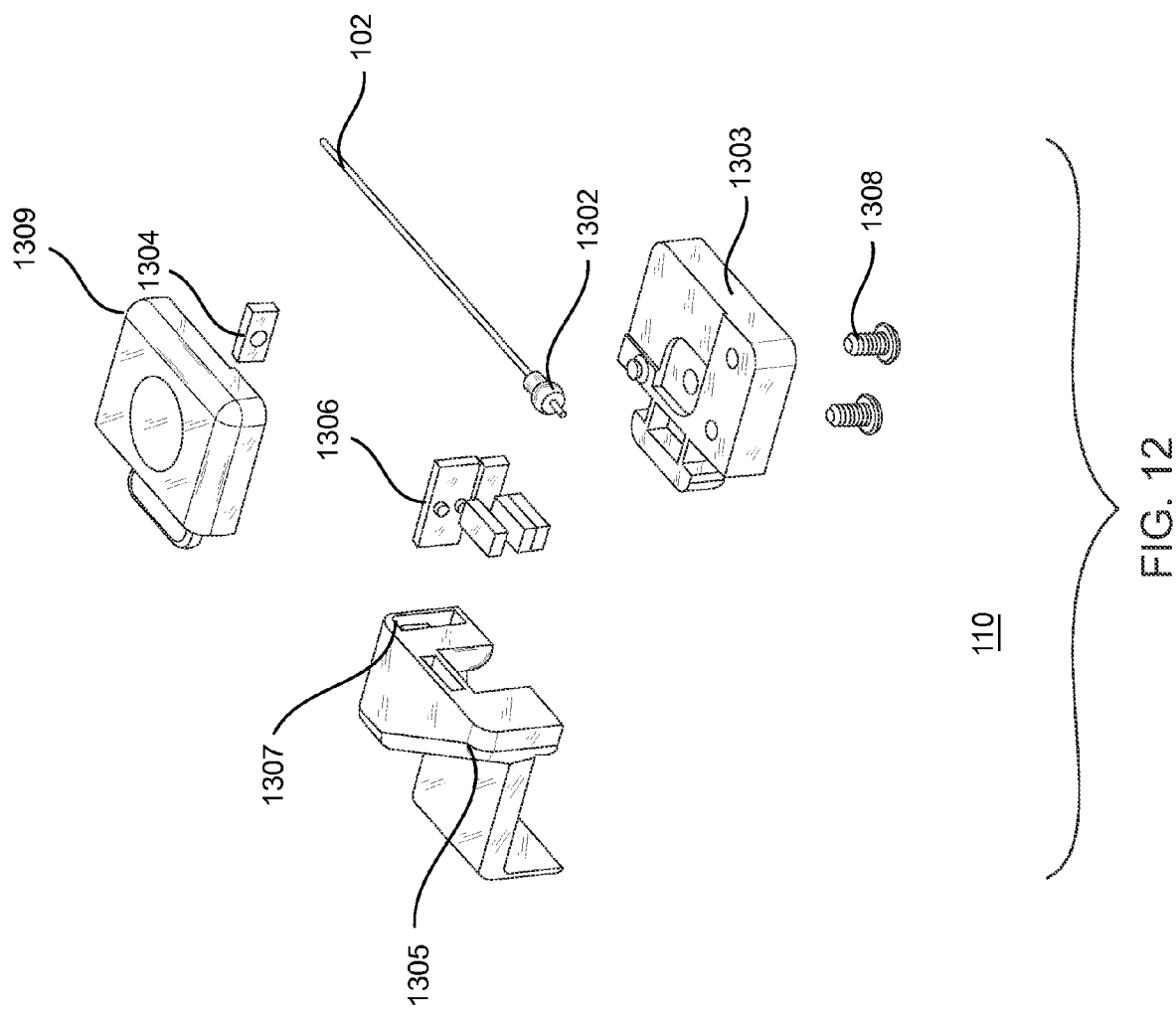

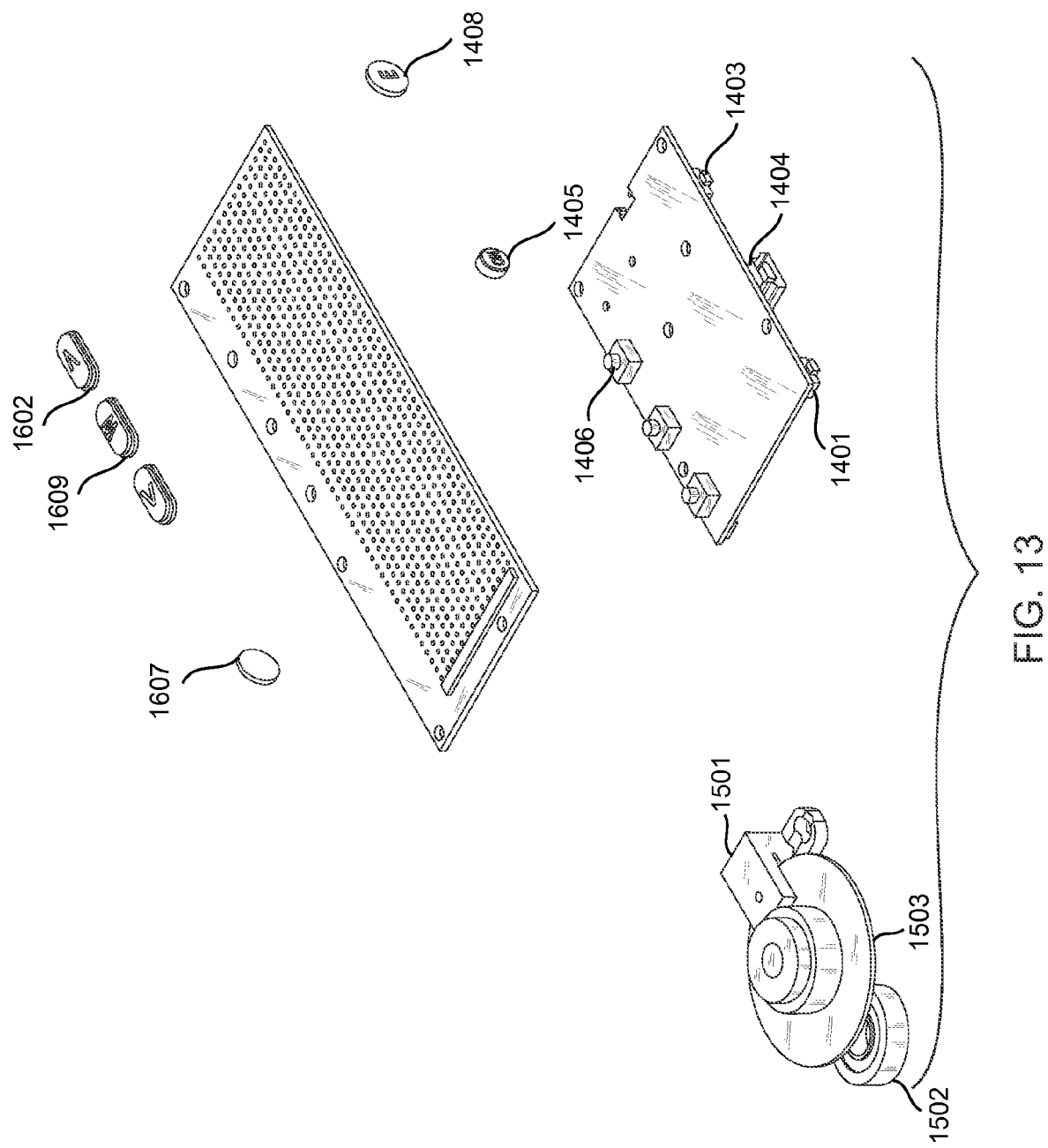

DIGITAL MEASURING DEVICE

CROSS-REFERENCE TO RELATED APPLICATIONS

The present application claims priority from Provisional U.S. Patent Application Ser. No. 61/173,636 filed on Apr. 29, 2009 and incorporated herein by reference.

FIELD OF THE INVENTION

The present invention relates to measuring devices. In particular, the present invention is directed toward a digital measuring device having a digital display and an extendable measuring wire with calculation abilities.

BACKGROUND OF THE INVENTION

Current tape measures do one thing: allow users to read units of measure after extending the tape. And while they perform that function well, reading the measurement is typically only the first step of several in order to collect and/or calculate and/or use the data. The most obvious being, after using a standard tape measure, one generally needs to write down the measurement, save the measurement and remember to bring the measurement with them to perform a task, purchase, or the like. Each step of this process takes time and can lead to error (costing time and money).

Additionally, the units of measure (hash marks) are printed directly on the tape and reading those measurements can be difficult (is that three eights or five sixteenths?) even in the best of conditions. Usually, a user needs to perform mental calculations immediately to get a better idea of the measurement: "127 inches divided by 12 is . . . what?" Because of the direct correlation between length of tape and the size of the housing, current tape measures usually max out at 25-30 feet (for hand held units). No product is currently available that exceeds this amount with resorting to the larger, crank-based products which are bulky and heavy.

Digital measuring tapes are known in the art. However, most of such digital measuring tapes comprise standard Prior Art measuring tapes (flexible metal tape rules) with a digital measuring device added on. The apparatus still functions as a measuring tape, with the option of reading out measurements in digital form. None of the Prior Art references discovered takes advantage of digital technology to create a whole new class of measuring instrument. As a result, most of these Prior Art digital measuring tapes are awkward to use and limited capabilities.

Komura et al, U.S. Pat. No. 4,890,392 and Corcoran, U.S. Pat. No. 5,386,643, both incorporated herein by reference, show tape measures with digital readouts attached to traditional tape drives, showing a measurement readout of the amount of tape unspooled. The readouts on such devices can be hard to see from a distance, and these devices do little more than provide a digital readout on a tape measure. The standard tape measure has indeed been a mainstay of construction, carpentry, and other arts as the measurement standard. However tape rules are limited in that they cannot flex around objects easily, and the hash marks on the tapes are hard to read. The Komura and Corcoran Patents provide a hard-to-read digital readout in place of hard-to-read hash marks.

A number of Prior Art devices described below are known in the art, all of which are incorporated herein by reference. Many of these are similar in that they are all were directed toward tape measures with digital readouts. These references are relevant in that they show various means for converting the amount of tape unspooled into a digital readout, including optical, magnetic, holes, and the like. These references also show the features of storing tape measurements and allowing for keypad inputs to such measurements (calculating area or other values).

There are a number of Prior Art references disclosing a hand-held measuring device having a digital display. Falk, U.S. Pat. No. 5,433,014, incorporated herein by reference, includes the additional feature of communicating a measurement to a remote location. In Falk, the remote location is a sawing station, which is provided with a dedicated receiving unit, which displays measurements and other data. Falk does not disclose transmitting data to a PC or the like. However, Falk fairly teaches the concept of transmitting data wirelessly to a second device.

The eTAPE device found on www.gadgetvenue.com, incorporated herein by reference, and also available on www.thinkgeek.com shows a digital display, iPod like interface pad, and the ability to add the case size to any measurement. The RYOBI, STANLEY, and OURHOUSE digital tape devices, all incorporated herein by reference, have similar features. Note that the STANLEY device will store multiple measurements, but only is capable of automatically adding them together.

Consumer reviews of such products, appearing on the web, are not positive. These prior art devices were mere combination of existing tape measures with additional digital features—not a product designed from the ground up as a digital measuring device. The Prior Art products merely forced new features onto an existing product concept, with predictable results. These were not designed well, features not well integrated, and they were ugly and clunky. Displays were small and poorly lit. However, there has been some positive feedback: "I am in the window treatment business and use for measuring for blinds, shades, etc. I find that the buttons for inside/outside, midpoint and others can easily be touched and change the measurement." Others, however, have been less kind: "I have to constantly check the mode before and after taking the measurement, its quite annoying and I have made more mistakes this than with standard measuring tape. Also, the size of the case does not allow pocketing or placing in most tool belts, but on the other hand, it doesn't hide easily. We returned it for a refund, Oct. 10, 2002. It was much too big and bulky, wasn't all that accurate, not worth the $$ . . . . We went back to the trusty regular metal type rule that works every time!"

Size is another problem noted by customers of the Prior Art digital tape measures: "It doesn't matter what kind of functions this tape has, there is one major problem with it—it is too big and heavy. I have the largest sized hands of anyone I know, and I could barely hold on to it with one hand without dropping it . . . let alone using the thing. Prepare to grow a third arm if you are going to order it, two arms to hold the thing, and a third to operate the tape. The pictures are very deceiving." Others have criticized the size and location of the display: "I was very excited to get this ruler from my kids for Fathers Day. However, I've been struggling with it for two months and have given up using it, with much disappointment. The problems: 1. You must turn on the ruler almost every time you pull out the blade. It only stays on for two minutes and then it automatically shuts down, and thus you must press the start button again. This is a nuisance. 2. The display is on the side of the ruler, not the top. So, you can only see the display if you pull the ruler in the direction that keeps the side near you. As a lefty I found it was on the opposite side of the direction I typically draw my ruler. 3. The memory function makes no sense. One would think there would be three or four separate memories to store multiple measurements before you go back to your workbench, right? But the memory is actually cumulative: Memory=Mem1+Mem2 etc. This is great if you are measuring something longer than the ruler, but most situations are multiple measurements on one object. 4. It's enormous, weighing several times that of a normal tape measure. Be prepared for your tool belt to list to one side. The positives: 1. The ability to add in the length of the ruler case for inside measurements. 2. The ability to display the readout in inches, feet and inches, or metric. All told, I was very disappointed. I'm sticking with a regular tape measure for now."

The above comments illustrate that there is a long felt need in the industry for a digital measuring device which has a large, easy to read display in a readable location, while at the same time being lightweight and easy to handle. Such a device should also be intuitive and easy to use.

The Voice Recording Tape Measure (www.rehabmart.com) device, incorporated herein by reference, contains a 10-second voice-recording feature to allow a user to record measurements or other data verbally. It does not appear to record actual data measurements from the tape, however. Rather, this device appears to be little more than a standard tape measure with a voice recordation device attached to it. The voice recordation device is not integrated into the tape measure—it does not record measurements automatically from the tape. Thus, it does not synchronize audio inputs with measurements. The user can record a measurement, but only by verbally speaking the measurement into the audio recording device. Such audio recording devices are commonly available, and a user could simply purchase one and attach it to his existing tape rule for the same effect.

Peterson, U.S. Pat. No. 7,363,723, incorporated herein by reference, discloses a Digital display (either LED or LCD), Save and recall functionality, Calculation of area and volume for the measured readings, Labeling each measurement as Width (W), Length (L), Height (H), a Camera to store a digital image which is associated with the measurement taken (Image tag is used instead of voice tag), and transferring measurements to a remote location via radio/optical communications. Peterson is interesting in that he specifically discloses a technique for converting measurements into time and materials calculations for carpenters, or painters, or for other applications, using memory chips. Peterson makes reference to transmitting data to another device, but it appears in his primary embodiment that these calculations occur in the tape measure itself.

Washizuka et al, U.S. Pat. No. 4,316,081, incorporated herein by reference, discloses a digital "tape" measure, which uses a chain of "balls" both magnetic and non-magnetic, enclosed in a synthetic resin. While the term "tape" is used in this reference (translation error?), it does not appear that a tape (flat) is used, but more a circular cross-sectional tube. Washizuka discloses a digital readout and input keys with his device.

Hara, Japanese Patent Document JP-56096297, incorporated herein by reference, discloses a measure with a wire. From the translated Abstract, Hara appears to fairly teach the idea of using a wire as a measuring device, with an electronic means used to measure the length of the wire and display the length on a display. Rickman, U.S. Pat. No. 6,928,029, incorporated herein by reference, discloses a measuring reel using a line and a digital display. Sanoner, U.S. Pat. No. 6,868,620, incorporated herein by reference, shows a similar device.

Malone, U.S. Pat. No. 5,802,732, incorporated herein by reference, shows an audio recorder combined with a tape measure. This Patent appears to cover the REHABMART device discussed above. Caraway, U.S. Pat. No. 7,370,433, incorporated herein by reference, shows a removable recording device. Hu, published U.S. Patent No. 2008/0072446, incorporated herein by reference, discloses a digital tape measure that is miniaturized (on a key ring).

Arlinsky, U.S. Pat. No. 6,658,755, incorporated herein by reference, discloses a tape measure with length and angle measurements, which may communicate with a computer or personal digital assistant or the like. The Arlinsky Patent is remarkably brief. While it discloses communicating with a computer 13, it appears that this communication is primarily from the computer to the tape device, so that the computer can program the tape device. Arlinsky does disclose (Col. 3, lines 35) transmitting data from the tape device to the computer "for printing" but does not suggest integrating such data into a software package.

SUMMARY OF THE INVENTION

The present invention comprises a small digital measuring device having a large LED display with the following features: Saving the measurement, Converting measurements from fraction to decimal/metric and vice versa, Rounding off measurements, Calculating functions, Labeling each measurement, Combining measurements into one display, Scrolling function, Digital recording, Locking at a set length.

The invention comprises a battery-powered device, about the size of an iPod, which measures distances via an extremely thin wire. The head of the device extends out on a retractable wire. There are no measurements printed on the wire, the distance is calculated and displayed on a very bright, large dot LED (Light Emitting Diode) or other type of display screen. As the wire is extended, a microprocessor calculates the distance and displays it on its screen. Measurements can be viewed (as decimal or fractions), saved and recalled. Mathematical calculations (listed below) can also be performed. The digital measuring device consists of a housing, a very thin extendable wire, cable or tape, a rotating spool, (from which the wire extends then automatically retracts to), a sensor which measures the amount of wire extended, a microprocessor, a tiny flash drive, or the like, a microphone/speaker, a large (size of unit) mono or duo chromatic display screen (LED) or other full color display technology, or the like, and a few buttons along with a menu driven interface which control functionally.

Additional features include using thin wire (line, cable, or the like) rather than a traditional tape. The wire may be round, flat, concave, or some other shape. In one embodiment, the wire may be configured to remain stiff for a number of feet in one embodiment so that a user can extend it straight out for short measurements. Neither numerical values nor any units of measure need be printed on wire/line in the preferred embodiment, although marks may be added in other embodiments, or for calibration purposes. The numbers, when displayed, are brightly lit on a dark background on a large LED display. Prior Art displays exclusively show numbers as black numerals on a gray or colored field, which is hard to read in a work environment. The unit saves and recalls measurements and records, saves and recalls digital audio. The unit synchronizes recorded audio with specific measurements. The device may be provided with a hard drive or other form of memory storage, enough hold hundreds or thousands of measurements and a couple of hours of audio files. The device can add, subtract, average, round, and combines measurements and store multiple results in memory or output them to another device. The device can also calculate volume, area, circumference, and the like and store and output the results. Data may be offloaded using USB, WiFi, web (IP) (e.g., Internet appliance), IR, removable flash card, or other means. In addition, through an internet connection, firmwear or system software can be updated periodically (as upgrades occur).

A "Smart Head" System provides a series of different heads, which users may select for specific applications. In one embodiment, a dock may be provided at the far end of the measuring wire. Various heads may be attached to the dock for various applications. These heads may attach physically and also electrically to the apparatus, depending upon application. A number of different hardware techniques may be used for converting wire extension into a digital measurement: Various encoders (optical, magnetic, hole counting, rotary encoder, and the like) may be used to measure wire as it is extended. The wire may be encoded (optically, magnetically, or the like) such that as it extends, increments are counted. Other techniques may measure characteristics of the wire itself (e.g., resistance, time delay of a signal, or the like) to determine distance of the extended wire.

BRIEF DESCRIPTION OF THE DRAWINGS

FIG. 12 is an exploded view of the head 110 of FIG. 11.

FIG. 13 is an exploded view of individual components of the apparatus of FIG. 11.

DETAILED DESCRIPTION OF THE INVENTION

Figure 1:
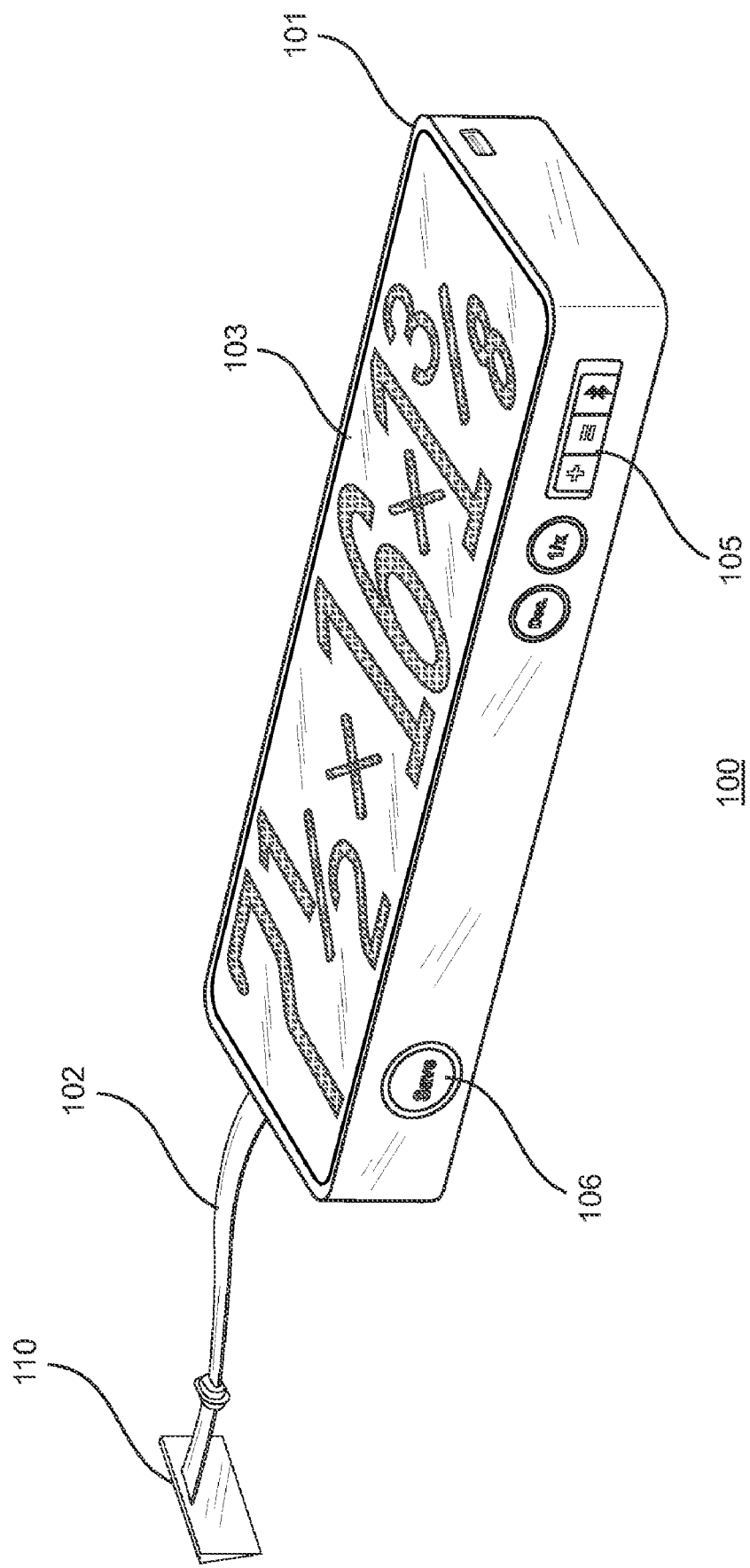
FIG. 1 is a perspective view of the digital measuring apparatus of the present invention.

FIG. 1 is a perspective view of an initial embodiment of the present invention, which illustrates the overall concept of the present invention. Referring to FIG. 1, the Digital Measuring Device (DMD) 100 of the present invention comprises an electronic measuring tape that displays, saves, and calculates measurements. About the size of an iPod, this battery powered hand-held device 100 measure distances via an extremely thin line or wire 102 which may retract into case 101. Wire 102 may comprise a thin tape or wire pair as well as single wire or string, but for the purposes of discussion will be referred to as wire 102. The head 110 of the device extends out on a retractable wire 102. Measurements do not need to be printed on wire 102 (although optionally such measurements could be added in some applications or may be provided for calibration).

Distance may be calculated and displayed on a very bright, large dot LED display screen or, in the preferred embodiment, on a full color backlight LCD display screen 103 or the like. LED display screens or backlit LCD display screens are inexpensive to purchase, and provide a bright, easy to read display from a distance, unlike the dim LCD screens used in Prior Art digital tape measures.

As wire 102 is extended from case 101, a microprocessor calculates the distance and displays it on screen 103. Wire 102 may be measured by counting rotations on a calibrated wheel, using a rotary encoder, optical encoder, or the like as will be described in more detail below. Optical, magnetic, or other markings may be embedded in the wire 102 (which as illustrated in FIG. 1 may be flat, but take on a number of cross-sectional shapes, including round, oval, or the like) and read by a sensor mounted near the outlet of the apparatus case 101.

In another embodiment, characteristics of the wire 102 itself may be used to determine distance. For example, resistance of the spooled out wire 102 may vary with length. Wire material may be selected for relative immunity to change in resistance with temperature, or temperature may be compensated accordingly. In an alternate embodiment, an electrical or RF signal may be transmitted down the length of wire 102 (which may comprise one wire or multiple wires in a bundle) and the time delay for the return signal used to determine length. A number of other measurement techniques may be used within the spirit and scope of the present invention. Measurements can be viewed, saved and recalled on screen 103 using control buttons 105 and save button 106. Mathematical calculations on measurement can also be performed using control buttons 105 and save button 106.

Figure 6:
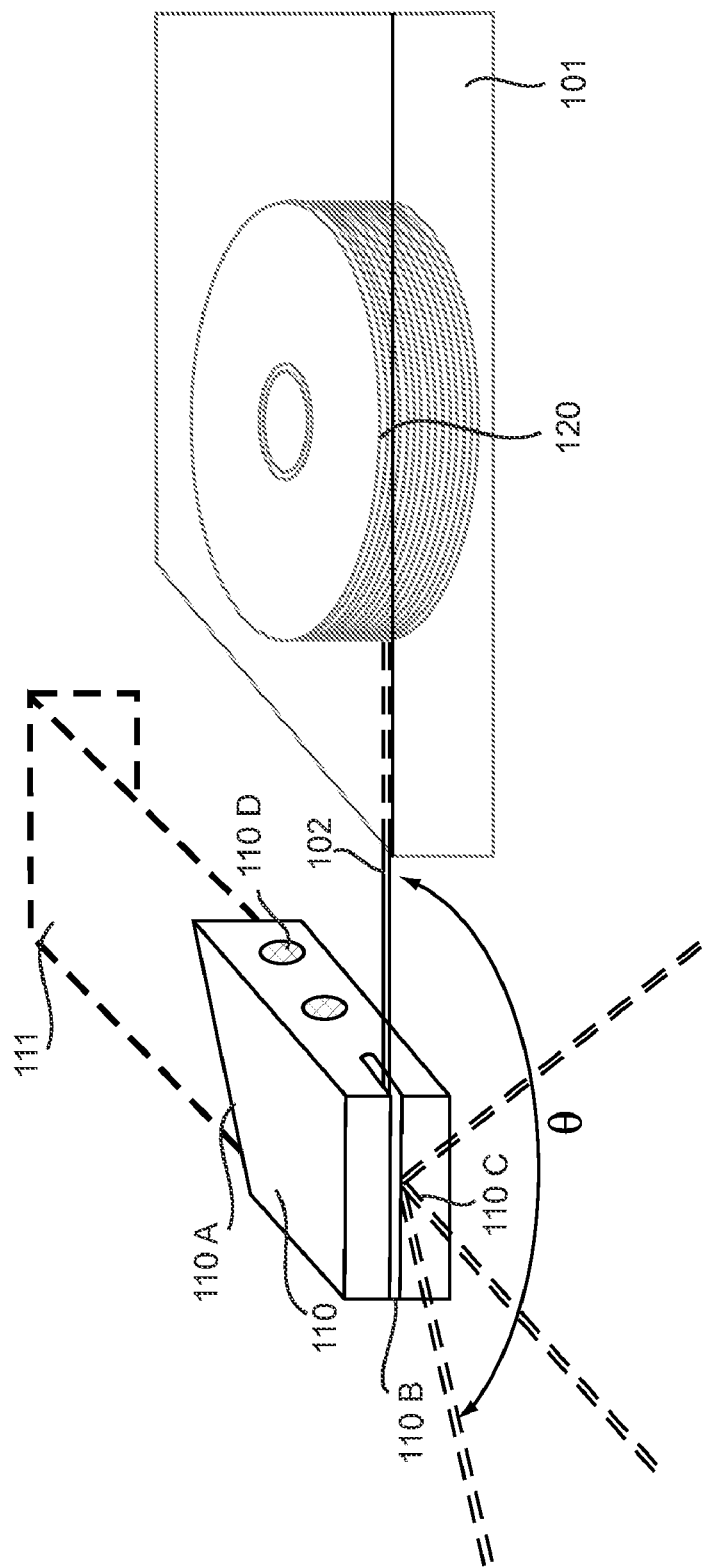
FIG. 6 is a phantom perspective view illustrating the details of the wire and spool arrangement with the dock and a sample post.

The digital measuring device comprises a housing 101 and a very thin extendable wire, line, cable or tape 102 (which may be rigid for up to 3 feet in one embodiment). Wire 102 may be wound inside the housing, as illustrated in FIG. 6, on a rotating spool 120, (from which the wire extends then automatically retracts to). A sensor measures the amount of wire extended, and a microprocessor then calculates and determines length measured and displays the data on a large mono or duo chromatic display screen (LED) 103. A combination of hard buttons 106, 105 and an interface may control functionally. A tiny flash drive or internal memory may be used to save measurement data. In one embodiment a microphone and speaker (not shown) may be used to record verbal data and play back such data, as well as play back measurements themselves using synthetic voice technology. Save button 106 may be used to save measurement data to the internal memory. Calculation and control buttons 105 may be used to add, subtract, and total measurements, as well as convert from decimal to fractions, and perform other functions.

Digital Measuring Device 100 accurately measures long lengths in a very small package, as the wire can be retracted into a much smaller space than a traditional tape. A zero-out/re-calibrate feature allows the device to be periodically calibrated and allow the user to set the unit to Zero as necessary when measuring. For example, if a user wants to measure 22.5 inches, then 6.75 inches, then 18 inches, he can press the Zero button between each measurement, which re-sets the unit to Zero each time. This allows the users to set/anchor the end of the tape one time for several measurements. In a calibration mode, a predetermined length of wire may be spooled out (e.g., to a marked position on the wire, such as one meter) and the device may then, in a calibration mode, electronically measure the distance using internal sensors and then compare this with the known value. When the wire is fully retracted (as detected when the head contacts the case) the zero position can be calibrated automatically after each use. In this manner, calibration offsets can be determined to compensate for wear and conditions.

In the embodiment illustrated in FIG. 1, the device displays measurements on a very large dot matrix LED screen, however, other types of displays may be used within the spirit and scope of the present invention. The large LED screen with the dot matrix display can also serve as an icon or trademark for the apparatus. Such LED screens are easy to read and also relatively inexpensive, as most consumer products are switching to graphics screens and the like. The display combines measurements into one display (i.e. the measurement of 11⅞×2½×6 as shown in the example of FIG. 1). For the U.S. Market, the device may display in feet/inches/fractions (default), but may be switched to metric measurements for other markets or applications. The display scrolls to show additional text data not appearing on the screen. Scrolling may be automatic (continuous after an initial pause period) or may be manually controlled via the buttons on the case. The apparatus saves and recalls measurements in memory, which may comprise a hard drive, SRAM, or the like.

Measurements and additional information, such as input from audio (e.g., material, location, and the like) may be saved as one entry. The DMD unit contains a tiny microphone and speaker allowing the user to tag and synchronize a digital audio recording to a specific measurement, which reduces the chance for errors. Saved measurements may be exported into spreadsheets or other applications via USB or wireless. The digital audio recorder feature allows a user to record a verbal audio tag and assign it to any specific measurement. (e.g., "kitchen floor" and 17' 6½"×12" are synchronized and stored in memory). Playback mode allows the user to playback the audio recorded, along with the measurement, which may be displayed visually. The associated measurement may also be played as a computer/digitally generated audio file, so that the user can play back a measurement and hear the audio designation and the actual measurement as one playback. The user's recorded voice memo may be played back, followed by or preceded by a computer voice generated playback of the measurement. Thus, for example, if a user says "kitchen floor" after having previously stored the measurements, the device may find the correct measurement and then play back the phrase "kitchen floor, seventeen fee, six and one-half inches by twelve feet". Voice recognition software may be used to control the apparatus as well. A user may say "find kitchen floor" and the apparatus may search for measurements tagged with that audio tag and then display them or play them back by audio. Voice recognition software may be used to convert audio files to text for display on the screen or for downloading to a computer spreadsheet, CAD program, or the like.

The device may also add, subtract, divide, and average measurements and store the resultant data in memory for later retrieval, either as audio playback or as alpha/numerical data for on-screen display. The device may also calculate volume, area, circumference, and the like. Since the wire is thin and flexible, it may be wrapped around objects to measure circumference directly, and then calculate diameter, or vice-versa. The device can convert measurements from fraction to decimal to metric with the simple push of a button or buttons. It automatically rounds measurements to nearest quarter, eighth, sixteenth, or whatever dimension specified within its range of accuracy.

The Digital Measuring Device of the present invention offers all of theses benefits and is superior to traditional existing tape measures. The user no longer has to waste time interpreting tiny hash marks printed on the tape surface and mentally converting or adding, or transcribing. The large LED display is much easier to read. A large, brightly lit display shows the measurements in large easy to read numbers (decimals or fractions) and has the ability to group and display collected measurements together (L×H×D). When the SAVE button is pressed, saved or targeted measurements may change color or flash. Other buttons illustrated in FIG. 1 may add, subtract, total, invert, or enable Bluetooth or other wireless connection. Buttons may be arranged in an iPod type arrangement, which is familiar to users and thus intuitive. Saving measurements eliminates the need for writing down (and carrying) measurements. The unit contains a small flash/solid state drive or hard drive, allowing the measurements to be saved to an internal drive for displaying at a later time. If the user has their digital measuring device (DMD) they always have their measurements with them.

Figure 2:
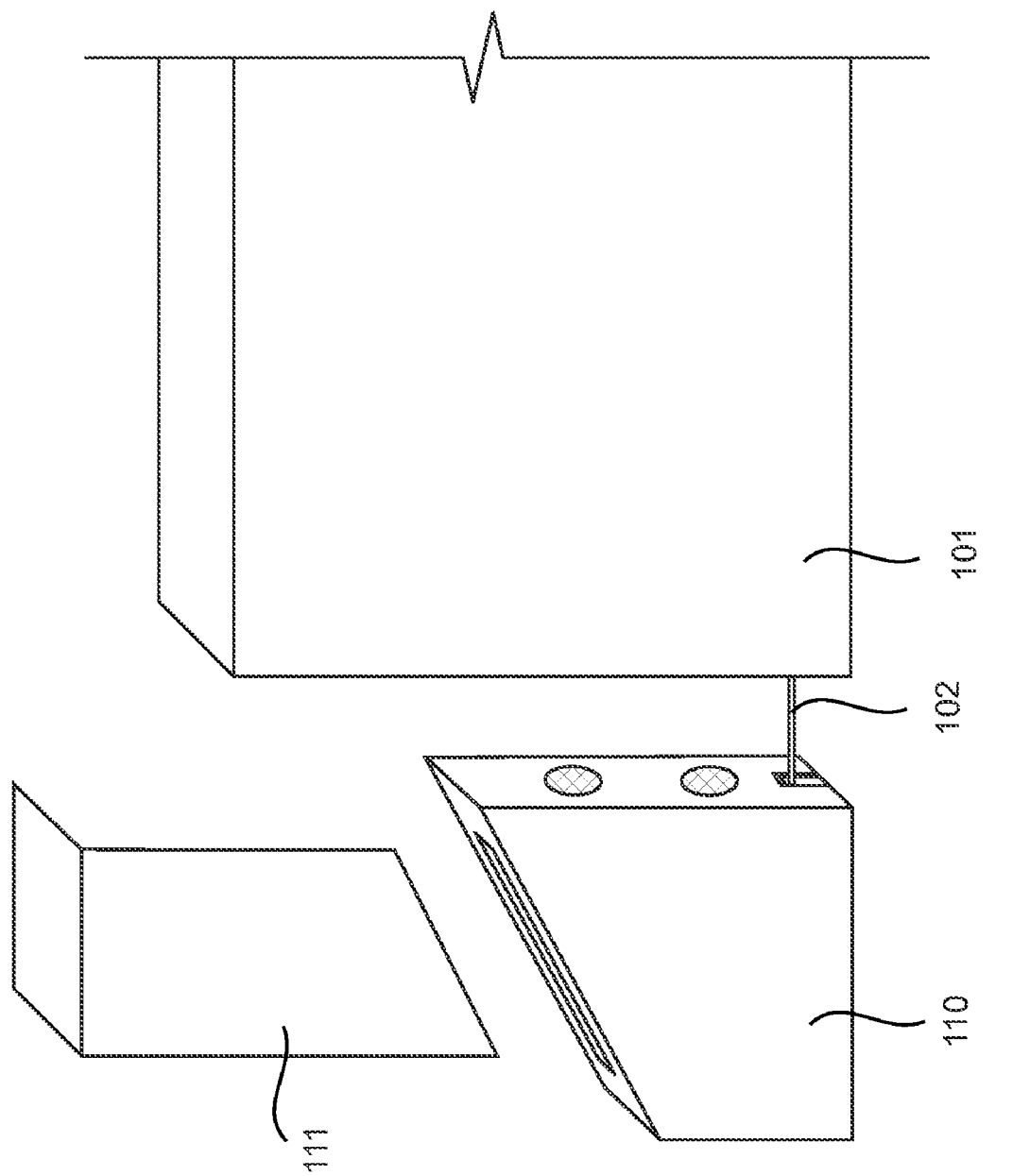
FIG. 2 is a an enlarged view of one end of the digital measuring apparatus of FIG. 1, illustrating the head dock and one of the head units.

The device may be customized for specific tasks via the Smart Head system, which includes a range of application-specific Heads or Posts. FIG. 2 is a simplified example illustrating how a specific post may be attached to the dock. Referring to FIG. 2, device case 101 may be coupled to head 110 via measuring cable 102. Various attachments, referred to here as "posts" such as angle post 111, may be attached to head 110 for different measurement tasks. Angle post 111 most closely mimics the traditional tab on a tape measure. As will be discussed in more detail below in connection with FIG. 3, FIG. 2 illustrates this post 111 and head 110 rotated 90 degrees to store more compactly against case 101.

Figure 3:
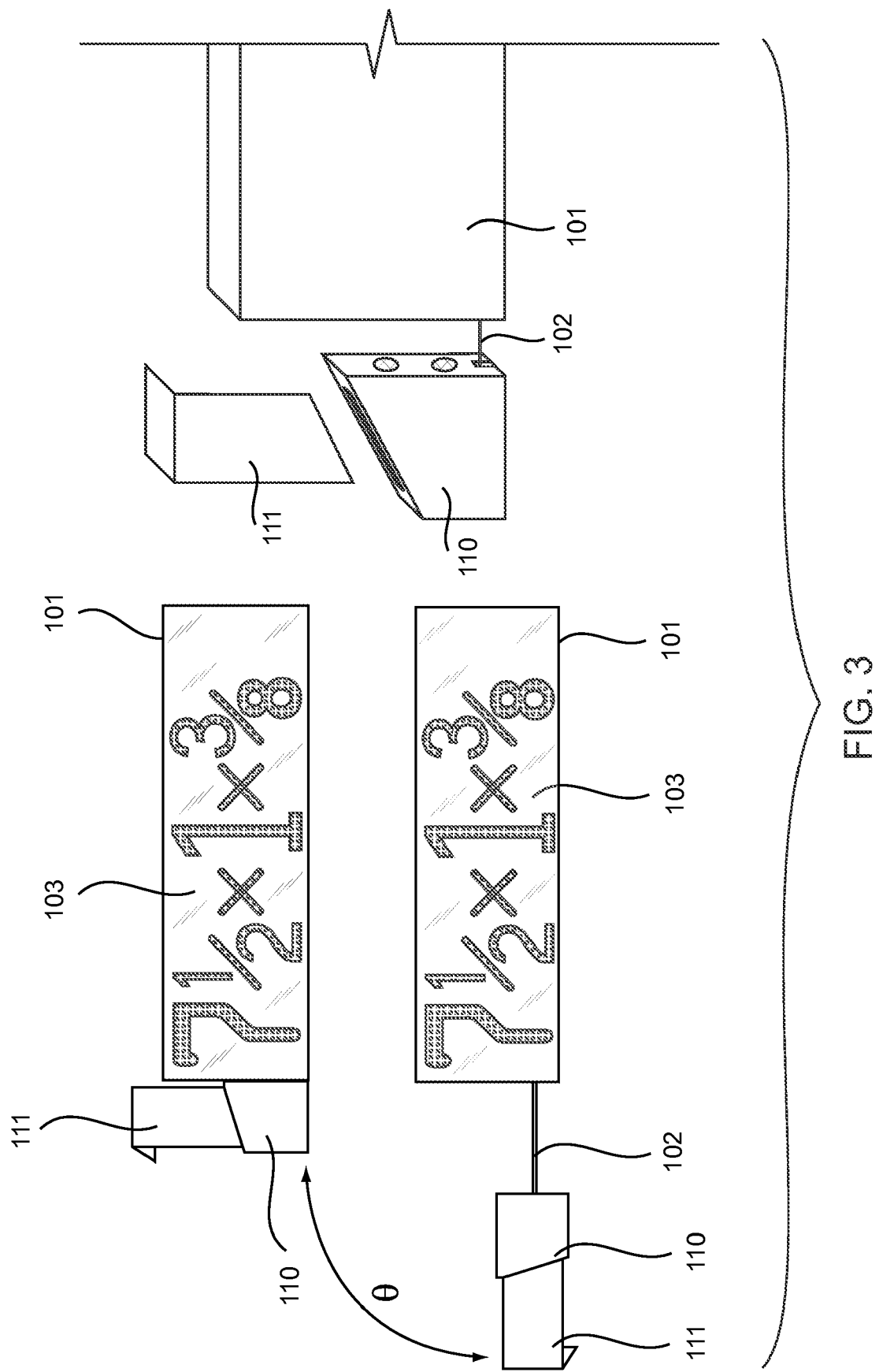
FIG. 3 is a side view of the digital measuring apparatus of the present invention, illustrating the dock and removable post of FIG. 2, and also illustrating how the dock can rotate relative to the wire.

FIG. 3 is a side view of the digital measuring apparatus of the present invention, illustrating the dock and removable post of FIG. 2, and also illustrating how the dock can rotate at angle θ (usually 90 degrees) relative to the wire. As illustrated in FIGS. 2 and 3, the DMD unit 101 may be connected to the dock 110 via the measuring wire 102. The dock 110 may adhere to the unit 101 via magnets or the like, and sensors in the DMD unit 101 may indicate when the dock 110 is fully retracted. Individual posts or heads, such as right angle post 111 illustrated here, may attach to the dock 110 for different measurement scenarios. For example, as illustrated in FIGS. 2 and 3, a right angle post 111 may slide into the dock 110. The type of post may be entered into the device via the buttons 105 of FIG. 1, through a series of menus, or alternately, the DMD unit 101 may detect the type of post electronically via wire or electrical contact.

In the preferred embodiment, the post 111 may be attached while the dock 110 is connected to the unit 111. Each post, such as post 111 illustrated, may have its information imbedded into itself, for example, as a coded resistor or the like, and that data may be communicated to the main unit 101 thru contact magnets that hold the dock 110 to the unit 101. The wire 102 itself may be "dumb" and no data may be transmitted thru it in one such embodiment.

Figure 4:
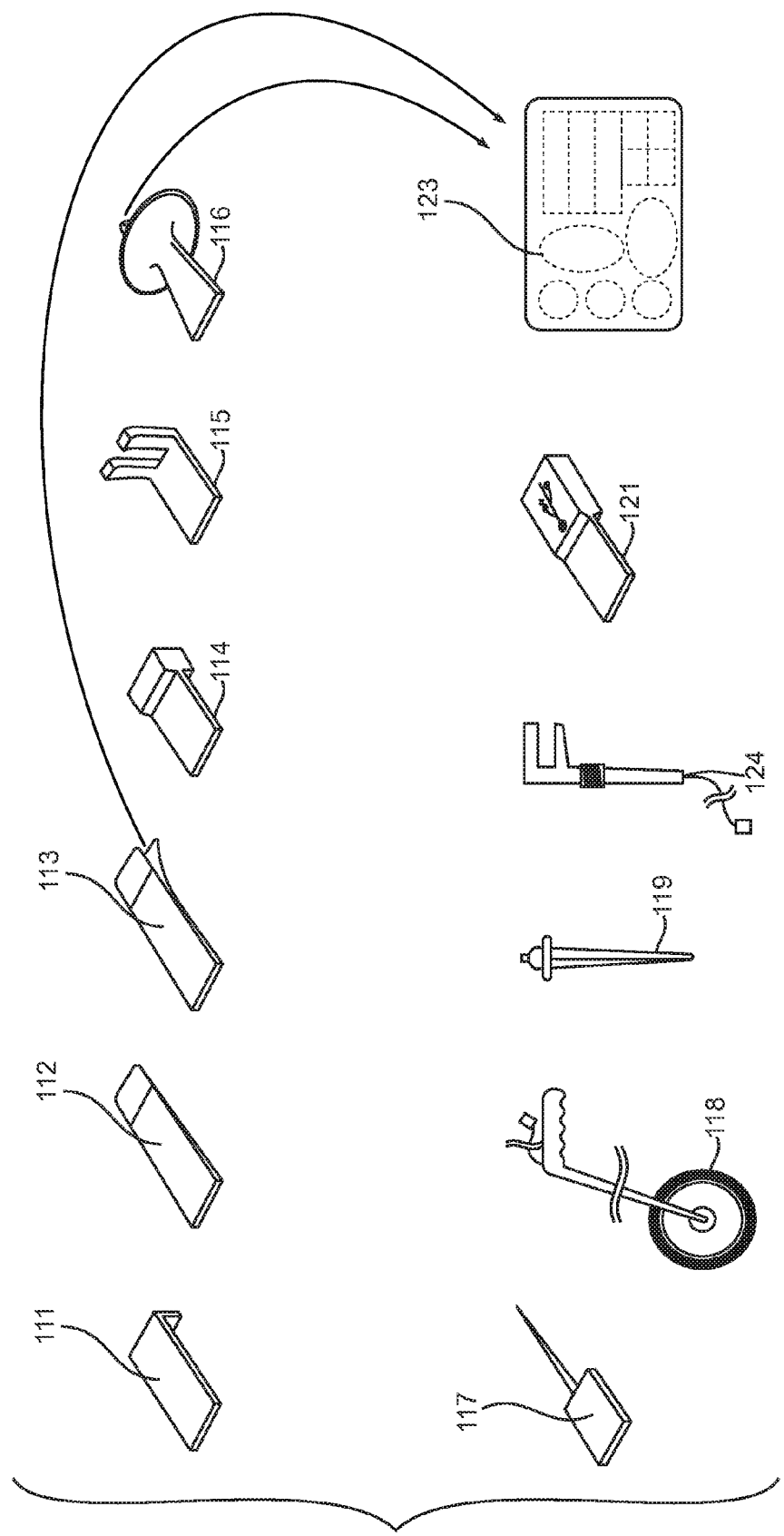
FIG. 4 illustrates the various adaptors and heads, which may be used with digital measuring apparatus of the present invention.

FIG. 4 illustrates various smart heads, which may be used with the Smart Head system. The Smart Head system is a line of changeable ends that a user inserts into a universal dock on the end of the wire. A flag post would be more applicable to 2D work (for designers) while a hook post would be ideal for Appraisers, for example. Additional posts may be sold along side of or packaged with the DMD. Users may buy new posts as necessary providing an on-going revenue stream. Additional Posts may be introduced on an on-going basis.

Each head performs differently allowing the user to select the Post most appropriate for the specific task. The DMD automatically compensates for the physical differences (dimensions) of each Post. New heads may be added over time for new applications, such that the DMD device is not limited in its scope of application. The following describes some of the different smart heads available for the DMD unit. Many of these posts allow the end of the wire 102 to be attached to an object so that the user can unreel the wire and take larger measurements single-handedly. Traditional tape measures provide a tab for this purpose, but such tabs have limited applications for measurement, and in many cases, two people are required in order to take measurements properly and accurately.

The first Smart Head 111 illustrated in FIG. 4 is the Post (Right Angle) head 111 previously described. This head 111 mimics the traditional right angle head used on Prior Art measuring tapes and may be hooked over the edge of any rigid surface. The Flag Head Post 112 is a translucent, flexible piece of plastic or other material that allows the user to see the starting edge of the material to be measured. The flag head post 112 is best used for two-dimensional items, e.g., papers, textile, blueprints or the like) and represents a departure and improvement over Prior Art tape measure devices.

The flag head post with reusable stick back 113 uses a reusable stick back adhesive for use on metal or other surfaces. Non-marring 3M type adhesive (good for 20 or so uses) may be used on finished surfaces (painted walls, and the like). The stickie post 116, like the flag head with reusable stick back, may also use a non-marring 3M type adhesive (good for 20 or so uses) for use on finished surfaces (painted walls or the like). The stickie post 116 differs from the flag head post with stick back 113 by nature of its shape and its intended applications. Both the flag post with reusable stick back 113 and the stickie post 116 are also shown more detail in FIG. 5. Referring back to FIG. 4, replacement perforated stickie sheets 123 may be sold separately for use on a variety of posts, such as posts 113 and 116. The user may keep such sheets 123 in their wallet or toolbox, and the sheets 112 may be branded with company logos, or the like.

The magnet post 114 contains a strong magnet (e.g. cobalt), which attaches the post 114 to any ferrous magnetic surface for measurement. The magnet post 114 may be useful for measuring steel beams, sheet metal, or other applications. The hook post 115 is larger sized that the right angle post 111 and may be foldable. This hook post 115 may be useful for applications where a traditional right angle post 111 is not sufficiently large enough to attach to items. The hook post 115 may be useful for outdoor measurements as well (e.g., landscaping and the like).

The pin post 117, as the name implies, has a strong metal pin, which may be stuck into unfinished material, such as wood or drywall or the like. The pin post 117 is illustrated in more detail in FIG. 5. The pin may be penetrated into a wood beam or drywall sheet and the wire unwound and measurements made from the location of the pin post.

The measuring wheel post 118 attaches to the dock 110 and communicates with the DMD unit 101 via the magnetic contacts, wire, or may attach directly to the DMD unit 101 through USB port or other interface. The measuring wheel 118 works in the traditional manner of measuring wheels, however the revolutions are electronically reported to the DMD unit 101 where they may be electronically stored, along with associated audio inputs or other data.

Also for outdoor use, the stake post 119 may be useful for landscaping, laying out foundations, and other types of outdoor work (e.g., civil engineering applications). The stake post 119, illustrated in more detail in FIG. 5, may be driven into the ground and attach to the dock 110, so that the wire may be spooled out in any direction. A 360-degree swivel may be used to allow measurement in multiple directions without rotating the stake post 119.

For more precise applications, the micrometer post 124 may be attached to the dock and communicate electronically with the DMD unit 101, or connect directly to the DMD unit 101 via USB port or other interface. The micrometer post 124 may be used for precision applications, such as machining work, where fine measurements are required. The micrometer post 124 may also be useful in industry for quality control and measurement. For example, when checking dimensions of finished parts from an assembly line, the micrometer post 124 can take measurements, which are then stored in the DMD unit 101. Out of tolerance parts may be readily identified via visual and/or audio cues, and moreover a running tally of part size and range can be computed. Since the apparatus 100 can be quickly reprogrammed to measure a number of different parts and dimensions, one gauge can be used to check tolerances on a variety of parts or part dimensions. For smaller production shops, such an application may save considerable time and energy compared to Prior Art techniques of preparing separate gauges for each part dimension, or manually measuring parts with a manual micrometer and writing down part sizes or comparing dimensions to standard values.

A flip out awl (or guide/pointer/marker) (not shown) may be provided in the base of the DMD unit 101 to mark a measured location. The marker may be an ink-jet or thermal type marker with an adjustable size "spray" which may, in one embodiment be a removable or optional module. The DMD unit 101 may also be locked (while extended) at a selected measurement. The retraction unit, described below in connection with FIGS. 11-13, may be variable speed and user controlled, to return/retract the wire 102. A hold button may hold a measurement and/or the wire 102 at a predetermined length. A flashlight mode may illuminate all the elements of the bright LED or LCD to function as a flashlight, or a separate LED may be provided for such a purpose. GPS Positioning may also be incorporated into the unit 101 (and/or added as a "post" accessory) and also applied for longer distance measuring. Position data from the GPS module may be stored in the unit and distances calculated from different GPS positions or tracks.

As noted above, the present invention may be provided with a Universal Serial Bus (USB) port, and in one embodiment, the USB port may be provided on the main body of the unit or as a post element 121 for connection to the dock 110. By attaching the USB post 121 to the dock 110, the unit is now capable of communicating with USB enabled devices. In an alternative embodiment, the measuring wire 102 may act as a USB cable. Other connection types may include Bluetooth, GPS, Ethernet, WiFi, or the like. For example, the measuring wire 102 may also serve as a WiFi antenna, or an antenna for WiFi or Bluetooth may be built into the DMD unit 101.

Figure 5:
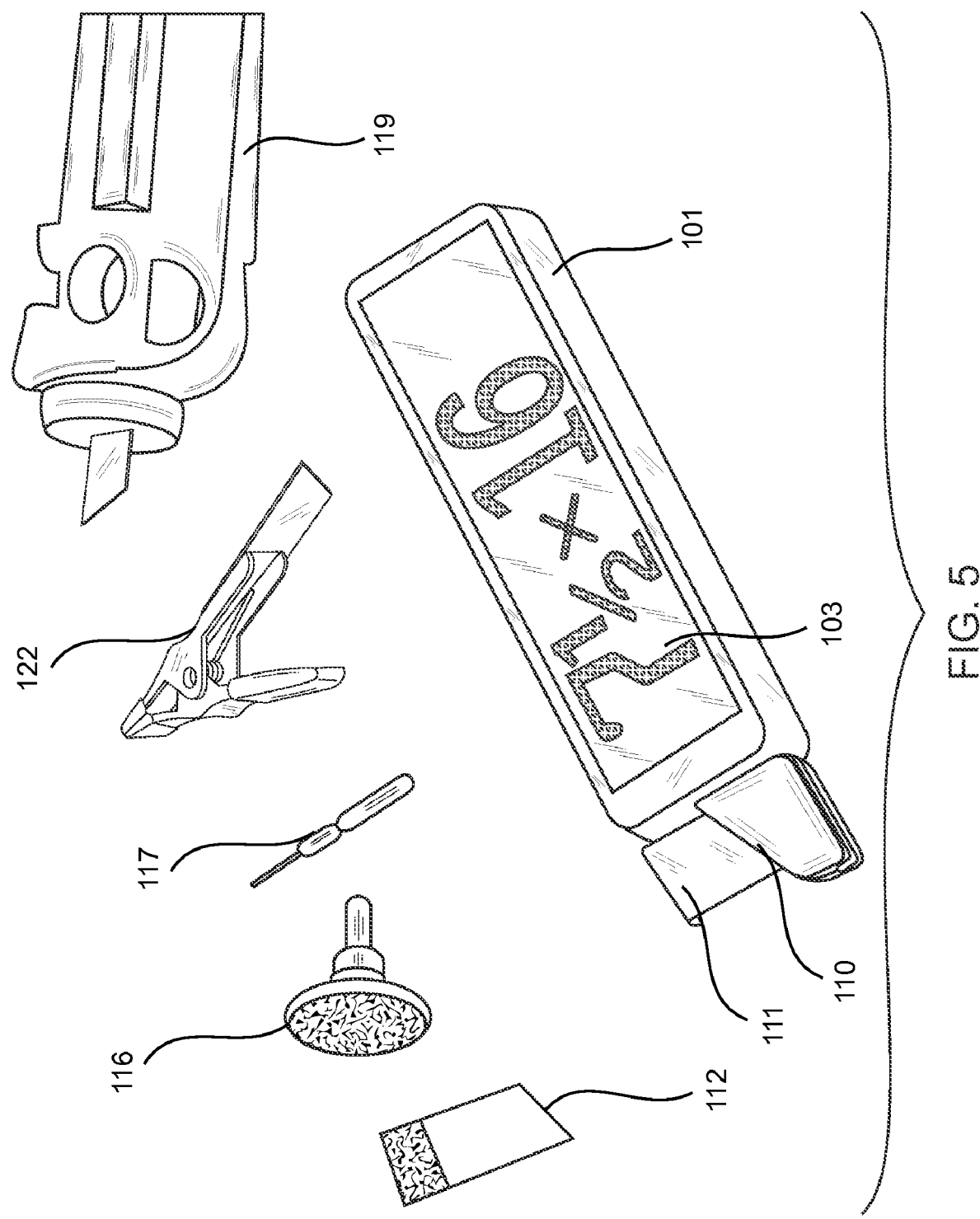
FIG. 5 is a perspective view of the digital measuring apparatus of the present invention illustrating various heads and the head dock.

FIG. 5 illustrates the DMD unit 101 with the angle post 111 attached to the dock 110 and also illustrates the flag post 112 with reusable stick back, an alternative version of the stickie post 116, pin post 117 and one end of stake post 119, previously described above in connection with FIG. 4. In addition, another post, the clamp post 122 is illustrated. The clamp post 122 allows the user to clamp to an object in order to take measurements. The clamp post 122 may be useful in applications where the angle post 111 may come loose during the measuring process, such as in measuring long distances or large pieces of material.

A full line of DMD units 101 spans from an economical unit with limited features (measures, displays and converts, possibly without changeable posts) to a high-end unit that contains all the features. The units may look identical, or, the Dock color may be altered to indicate (for all to see) what grade of unit it is. Initially, the unit may be available with at least five Posts available. Some posts may be included free with the DMD unit 101 when purchased and others sold separately. Replacement spools (of wire) may also be available and installed in the unit by disassembling the case or through a snap-in spool.

Note that other features may be incorporated into the unit 100 without departing from the spirit and scope of the present invention. As the unit 100 is already provided with memory and audio playback and recording capabilities, as well as a USB or other interface, the device may serve as a portable MP3 player as well, storing music and other files in memory not being used by measurements and the like. In addition, other measuring features may be incorporated into the device. A simple spirit level may be added to the device to increase its utility, or an electronic version of a spirit level may be incorporated into the device to display on the LED screen level. Other types of sensors may be incorporated as well, such as temperature sensors and the like. With a removable temperature sensor Post, the device may be used to remote temperature monitoring and data logging. With the USB Post 121, any type of data may be monitored and logged from a corresponding USB device. In this manner, the apparatus may be useful in a number of data logging applications as a less expensive alternative to laptop computers or the like.

The basic DMD unit 100 may be provided with a number of swappable Smart Heads (Angle and 3 Flag Posts included) and provide a wire 102 approximately 30 ft in length. Measurement resolution may be approximately 0.0625" @30'. The unit displays in feet/inches/fractions, as illustrated in FIG. 5. The unit may convert measurements from fraction to decimal to metric, and rounds measurements to nearest sixteenth. A scroll function allows the display to be scrolled to display further information, or the display may be set or pre-programmed to automatically scroll. The DMD unit 101 may be water resistant and provided with an auto on/off feature. As noted above, a Zero-out/re-calibrate feature may be provided to recalibrate the zero measurement every time the dock is retracted to the DMD unit 101. Other calibrations may be optionally made on a periodic basis by spooling out a predetermined amount of wire (or all the wire) and then entering a calibration mode. The Zero button also allows users to re-set the measuring device to Zero at any time.

A middle-level DMD unit may include all of the features of the basic DMD unit plus the ability to save and recall 25 measurements. Forward and back buttons (FIG. 1) may be used to scroll through saved measurements. The DMD unit may combine measurements into one display (i.e. 11⅞"×2½"×6"). Moreover this middle-level DMD unit 101 may be provided with addition, subtraction and division features, as illustrated in FIG. 1. The addition function may add consecutive measurements together (e.g., 12"+27"+6¼") and display the result (e.g., 45¼" or 3' 9¼"). The segment feature may be used to mark evenly spaced points. Once a user takes a measurement, he can divide it into as many equal sections as desired. The result of that calculation appears on the LED or LCD screen 103 and the unit may display an arrow to indicate which direction to move the device, then flash or give an audio signal when the target measurement is reached. Tactile feedback may be provided such that as the line is extended, there is a tangible bump in the line every ¼" or other predetermined dimension, in a similar manner to how control knobs for stereos and the like provide a tactile feel. This may be provided using an internal mechanical wheel coupled to the reeling mechanism, with a serrated edge and a tab, such that as the wire is extracted, a slight bump is felt every ¼" or other predetermined dimension.

A high end DMD unit 101 may include all the features of the middle level and basic DMD unit plus an increased 50+ ft length. Measurement resolution maybe increased to 0.03125@50. The digital audio recorder may be provided so that a user can record a verbal audio tag and assign it to any measurement (e.g. "bookshelf depth" or "kitchen floor"). The DMD unit 101 may save and recall 100 measurements and one hour of audio. The high end DMD unit 101 may download and upload or transmit data to PC or other device (via USB, wireless or other link) and/or can be network enabled (IP address) to operate as an Internet appliance. Both measurements and audio can be transferred via Plug-in software so data can automatically populate a spreadsheet, architectural design program, or other design software. The high end DMD unit 101 may round measurements to user presets. It may also add, subtract, divide, multiply, calculate volume, area, circumference, and the like. When uploaded, a saved audio file can be saved as an audio file (mpg or the like) or converted to text (editable) when voice recognition type software is used.

A recharging station may be provided for the unit, to recharge internal rechargeable batteries. This recharging station may plug in via the dock (with a wall-pack transformer serving as a charging post). The USB post (or port) may also be used for charging and the like. The apparatus may be offered with software packages, or independent developers may develop software packages of their own. Thus, for example, a software package for a roofing contractor may download to the DMD unit 101, a series of prompts for various measurements. In the field, these measurement prompts may be played on the internal speaker in a particular order. The estimators may then scroll through each measurement and take various associated measurements in response to the prompts. The estimator may also be able to add additional measurements, synchronized with audio input. Once finished, the DMD unit 101 may be docked with a laptop or other computer and the data downloaded or uploaded. PC software may then calculate area of roofing, and the amount of materials (squares of shingles) as well as flashing and labor, and generate an accurate price quote on the spot. In the Prior Art, contractors had to rely on vague and inaccurate square footage calculations, which were often off, and did not consider labor costs and flashing and edging costs, as well as material waste. The present invention allows for much more accurate measurement, and corresponding software may be able to calculate material and labor costs much more accurately as a result. As a result, contractors will bid jobs more efficiently and not risk underbidding a job.

Such software applications may be developed by third parties or open source developers. Forums, websites, developers tools, and the like may be developed for users, who may then find applications for the DMD unit 101 not even envisioned by the inventors. By making it easy for users to develop applications, programs, and utilities, the number of uses for the DMD unit 101 may expand continually. Different fonts may also be used to create a two-line display, graphics, or the likes. Users may upload, download and transfer data to the Internet, websites, computers, other DMD units 101, or the like. Users may also upload or transmit saved data to spreadsheets, ftp sites or a DMD user website, other DMD owners, and the like. Users may download and run applications/programs, which contain building projects or the like—everything from crafts projects to house plans. Downloaded data (play an episode, i.e. build a shed) can contain a materials list, audio prompts, measurements and the like. Such downloadable packages may be cross promoted with home improvement shows, magazines, and websites. With an optional video screen, actual instructional videos can be played back on the device or on an optional video screen, in the same manner videos are played back on an iPod or other device.

An integrated inkjet/thermal or other marking method module may be provided to mark a measurement point and imprint a surface with measurement data. As an Internet appliance, the DMD unit 101 may be used for social interaction by pinging co-workers, exchanging information or the like. In one embodiment, the DMD unit 101 may be cell phone enabled, to communicate data and even voice messages (e.g., Push to Talk or PTT) or be integrated into cell phone functionality. Users may obtain text and information demonstrations on a cell phone while at a retail outlet, for example, as an iPhone application.

The DMD unit 101 has been described above in terms of its features and functionality. The following descriptions illustrate how the DMD unit 101 may be used in a manner, which is more than a mere digital version of a Prior Art Tape measure. For example, an artist has a print she wants to frame. She knows she will need to have the measurements with her at the store. She uses the angle head 111 and measures the width of the print (18.5") and presses a button, which records the data. She then measures the height (24") and presses the button twice instructing the unit to combine the two measurements into a single entry. When she pushes the DISPLAY button, the measurement 18½ w×24 h appears on the screen. Because she has some other measurements already stored in the unit and wants to remember this measurement is for the frame, she presses and holds the button for 5 seconds, when an audio beep confirms she is in record mode, she speaks into the unit and says "Frame". That audio "tag" is now digitally recorded and synched with that entry.

When reviewing frames at the store, she cycles through the entries in the unit until a large 18.5 w×24 h is displayed in the screen. She confirms it was the frame measurement via the audio recording or a digital readout of her audio tag (e.g., using voice recognition). She notices that the European frames are labeled in centimeters, not inches. She simply pushes the convert button and the display now reads 224×397 cm. She selects the of the appropriate size frames. She wants to hang the 3 prints spaced evenly across her living room wall. She attaches the pin Post (or Stickie post) to the wire tip in the Dock and presses it into the drywall corner at the beginning of the wall. She stretches the measuring device across the length of the wall—the wire extends from the housing calculating the length. She touches the back-end of the device to the opposite wall and presses the button. The unit adds in the size of itself and displays the length: 25.5 feet.

Since the frames are to be spaced evenly across the wall, she (on the unit) divides by 4 (so she has four sections or three 3 dividing lines) and presses the button. She enters into "menu" mode and selects the SEGMENT option and enters the number of segments she wants then hits the OK button. She now knows to place a nail every 6.365 feet in order to get three evenly spaced points along the wall. She presses the button again and the unit calculates that the first nail is at 6.365 feet, the second nail at 12.75 ft and the third 19.125. Those numbers, when displayed on the unit, now show in red. Because she has not removed the anchor pin, she simply extends (or retracts) the wire until those numbers (in red) are displayed, flips out the marking awl on the side of the unit, and makes a light impression on the wall indicating where the center nail for each frame should be affixed.

In another example of use, a shopper has been thinking about replacing her bookshelf. Since the new one will need to fit exactly where the old unit is currently, she needs to measure it in order to compare it with the new units at the store. She hooks the lip of the right angle measuring head 111 on one side of the bookcase and walks to the other side, extending the wire from the housing unit until the head of the unit is just on the other of the bookcase. She presses the button, which enters the measurement. She does this two more times and the unit groups the measurements together and it is displayed on screen as "48 w×72 h×18 d". She again voice tags that entry with an audio recording of "Bookshelf dimensions" and saves it. She tosses the unit into her bag. That entry is now saved—along with the measurements for the flower pots she needs (8" diameter), the area rug she's been thinking about (no bigger than 10.5×7'), and the wicker baskets that she wants to slide under the bench in the mud room (no taller than 13" and enough of them to extend from one end to the other: 72"). Most importantly, all those measurement are with her all the time so when she sees something she that might fit her needs, she simply scrolls thru the saved entries to see if the item works for her space.

In another scenario, a homemaker wants to figure out how much contact paper she needs to line her kitchen drawers. She measures a single drawer (using the "include length of unit in calculation"), W×D. she gets 16"×20". She presses the button and the unit calculates the area—320 square inches. She presses the button again and calculates that with a total of 14 drawers, she'll need 4480 square inches of material. She presses the button and converts it to feet—373.3 sq ft. She saves that measurement on the unit and tags it w/ a digital audio recording, "amount of paper to line kitchen drawers".

In another scenario, a handyman needs to replace a section of drainpipe. Since the pipe is still employed draining water, he cannot measure the diameter. He can however, measure the circumference using the wire. That is 17.27". He presses the button and the unit calculates that the pipe has a diameter of 5.5". He also decides to varnish his boat deck. The deck is 30'×15'. After measuring, the unit calculates that he has 450 square feet of deck. The label on the can of stain indicates that each can of stain will cover 500 sq ft. He buys a single can of stain.

In another scenario, a professional working for an architectural firm is hired to renovate a large apartment. Her assignment is to get the current measurements of each room. Normally, tape measure in hand, she'd take each measurement room by room, write each measurement down (double check everything), then, once back at her office, she'd need to transcribe, into her computer, every entry and double check everything again, which is very time consuming. With the Digital Measuring Device 100, once the data is saved on the unit, she can connect it to her PC via a USB cable (or wirelessly via Bluetooth or the like) and the data will automatically download and populate an Excel spreadsheet or architectural software—including the specific room labels when used with voice recognition software.

In another example, a technician is wiring his office for a small computer network. He has several computers around his office and all must be connected to the server room via an Ethernet cable. The cables will start at the respective computers and terminate in the server room. The cable will be affixed to the baseboard of the wall—from one wall to the next—until it reaches the server room. He starts at the computer and extends out the line to the first wall corner—9 Feet. He presses the button to save. Now he instructs the unit to ADD the next measurement to the current one. He measures to the next corner—20.5 feet. The unit displays 29½ feet. Then the next wall is measured—12.25 feet, then the next—8.5 feet. He is at the server room. He pulls the line out mannually another 5 feet (to add in extra cable for safety) and adds that to the total. The unit calculates 55¼ feet. He does this for each of the other computers adding each measurement to the ONE total. When he is finished, He knows he needs 863 feet of cable. He saves and audio tags that entry. Because He is a technician, he will buy the raw cable he needs then attach the RJ45 ends as necessary. Twelve computers times two jacks at each end—total 24 jacks. He manually keys in 24 saves and tags that as "rj-45's for office." He does not need to continually write down each individual wall measurement and add them together. He does not need to double-check his math. He does not need to re-write his totals on a pad along with the few different lengths of extension cords he needs. When he goes to the store in a few minutes, all the information is already stored on the unit.

FIG. 6 is a simplified phantom perspective view illustrating the details of the wire and spool arrangement with the dock and a sample post. As illustrated in FIG. 6, the DMD unit 101 has a spool 120 on which the measuring wire 102 may be coiled. This spool 120 may be spring loaded to retract the wire 102, or may be electronically rotated (stepper motor or the like, not shown) to extend or retract the wire 102. A friction clutch may be provided between the stepper motor and spool 120 to prevent the user from damaging the motor by pulling out the wire 102 or the like. If the friction clutch slips, an error indicator may be displayed on the screen, or the word "ERROR" to show that the wire 102 has been pulled off the spool 120, rather than dispensed by the stepper motor. In such a situation, the user would then retract the wire 102 and allow the unit to recalibrate and zero itself.

The dock 110 may be removably attached to the DMD unit 110 using one or more magnets 110D, which may attach the dock 110 to the DMD unit 101 in retracted mode and also serve as contacts for a data link. As illustrated in FIG. 6, the dock 110 may rotate at angle θ in the X-axis range of the wire 102 by means of a center pin to which the wire attaches in slot 110B. For most measurements, wire 102 may rotate at an angle of 90 degrees as illustrated by position 110C. The top of the dock 110 has a slit 110A to accept the posts as previously discussed. A sample post 111 is illustrated in FIG. 6 as the traditional right angle post. A latch or release mechanism may be pressed to removably release the post from the dock.

The wire 102 used for the DMD unit 101 may comprise wire, cable, cord, tape, monofilament or the like that is a small gauge or thin. In one embodiment, when extended, it may be stiff for up to a number of feet before "breaking". The wire 102 should also have no "memory"—when wire extends; it extends straight without curling. The wire 102 should be flexible enough to be wound around small diameter storage spool/drum with no or limited distortion (expansion or contraction). The wire 102 is also light and kink-free.

Figure 7:
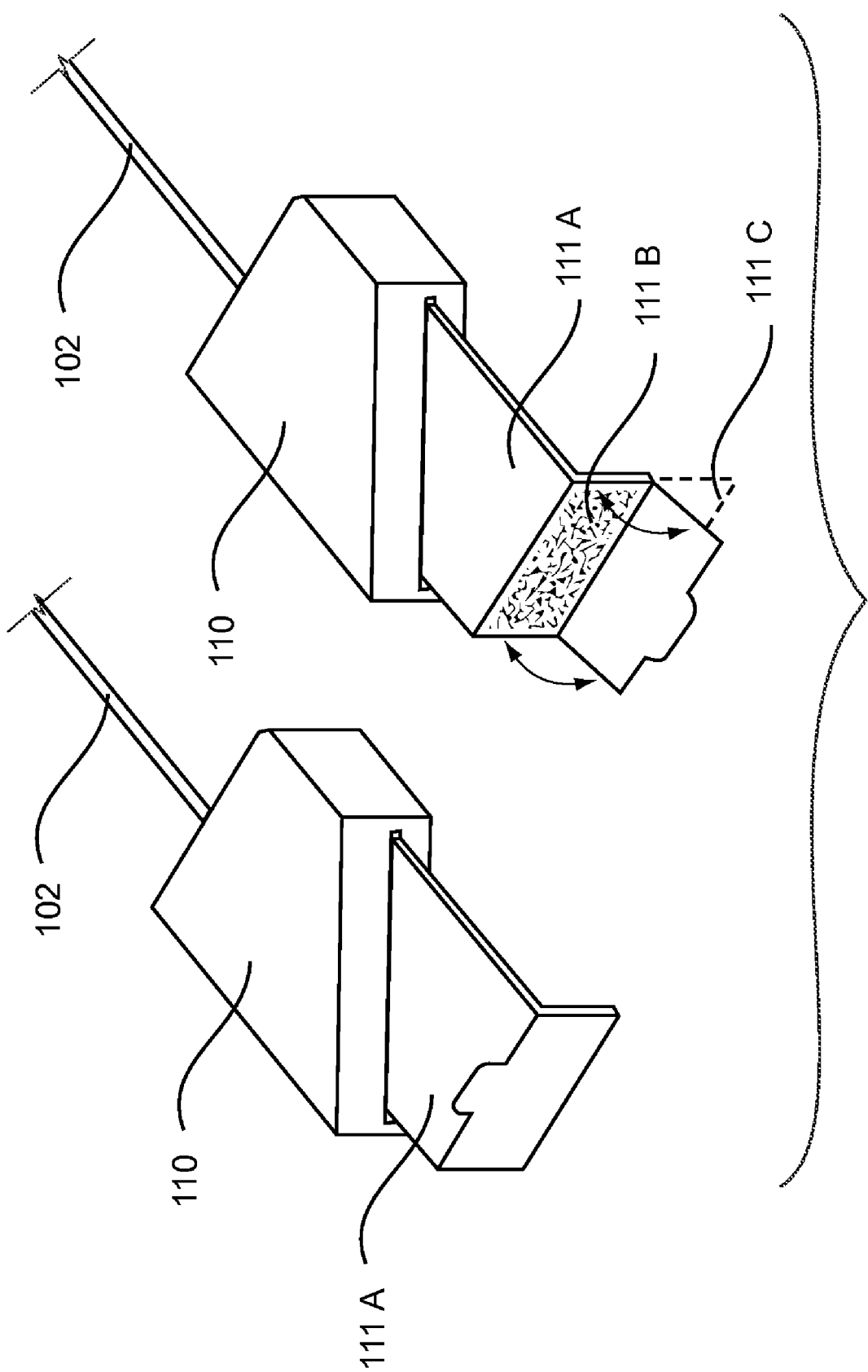
FIG. 7 illustrates perspective views of a post design with a hinge that exposes non-marring, re-usable glue that enables the user to anchor the head to a wall or other surface.

FIG. 7 shows two perspective views of an angle post design 111A with a hinged portion 111C that exposes non-marring, re-usable glue 111B that enables the user to anchor the head to a wall or other surface. Referring to FIG. 7, dock 110 is coupled to wire 102 as in previous Figures. Post 111A is provided with a hinged portion 111C that may cover glue portion 111B as shown in the left-hand side of FIG. 7. In this mode, post 111A may be used as a standard right-angle post 111 as previously discussed. However, as illustrated in the right-hand side of FIG. 7, hinged portion 111C may be folded down or removed to expose glue portion 111B such that glue angle post 111A can be attached to a wall or the like for measurement purposes.

Figure 8:
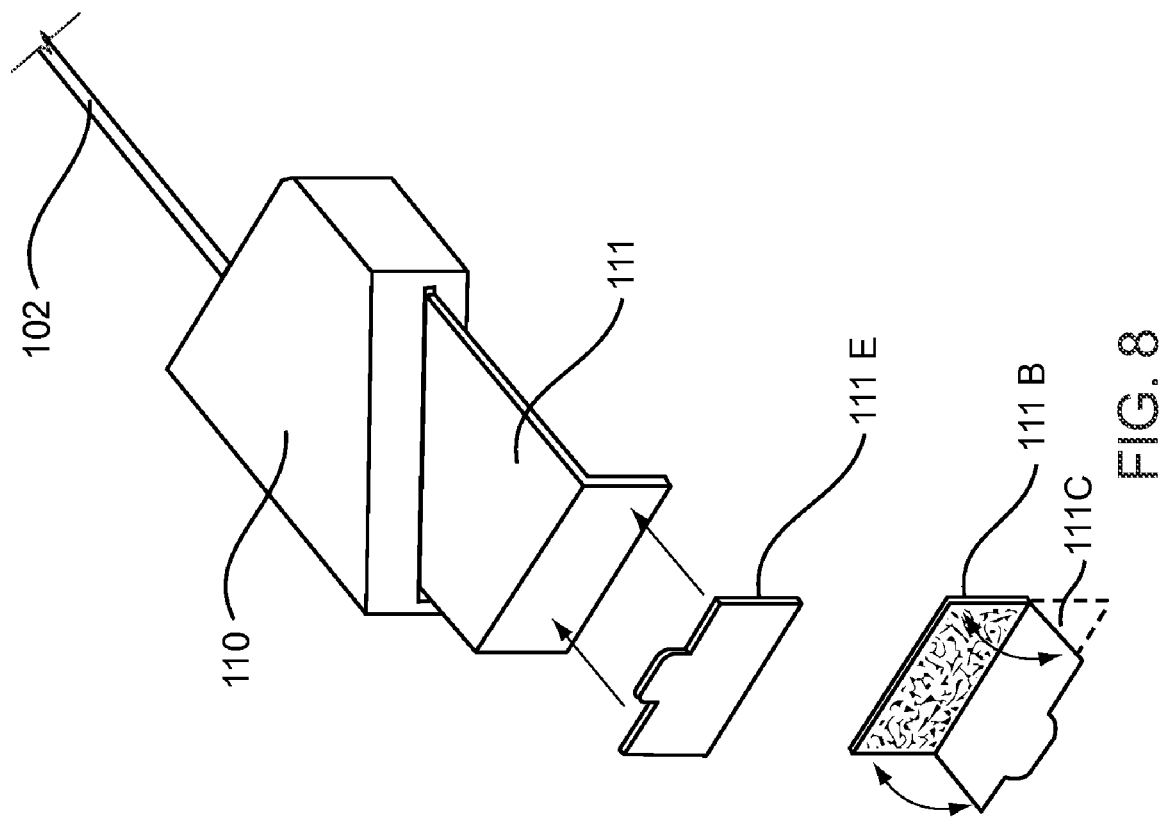
FIG. 8 is perspective view is another version the post design, where an accessory attaches to the standard angle Post to achieve the same effect as the embodiment of FIG. 7.

FIG. 8 is perspective view of another version the post design, where an accessory attaches to the standard angle Post to achieve the same effect as the embodiment of FIG. 7. In the embodiment of FIG. 8, angle post design 111 may be attached to accessory 111E using glue or the like. Accessory 111E may be provided with a hinged portion 111C that exposes non-marring, re-usable glue 111B that enables the user to anchor the head to a wall or other surface. Dock 110 is coupled to wire 102 as in previous Figures. Accessory 111D is provided with a hinged portion 111C that may cover glue portion 111B. Post 111 may be used as a standard right-angle post 111 as previously discussed. However, hinged portion 111C may be folded down or removed to expose glue portion 111B such that glue angle post 111A can be attached to a wall or the like for measurement purposes.

Figure 9:
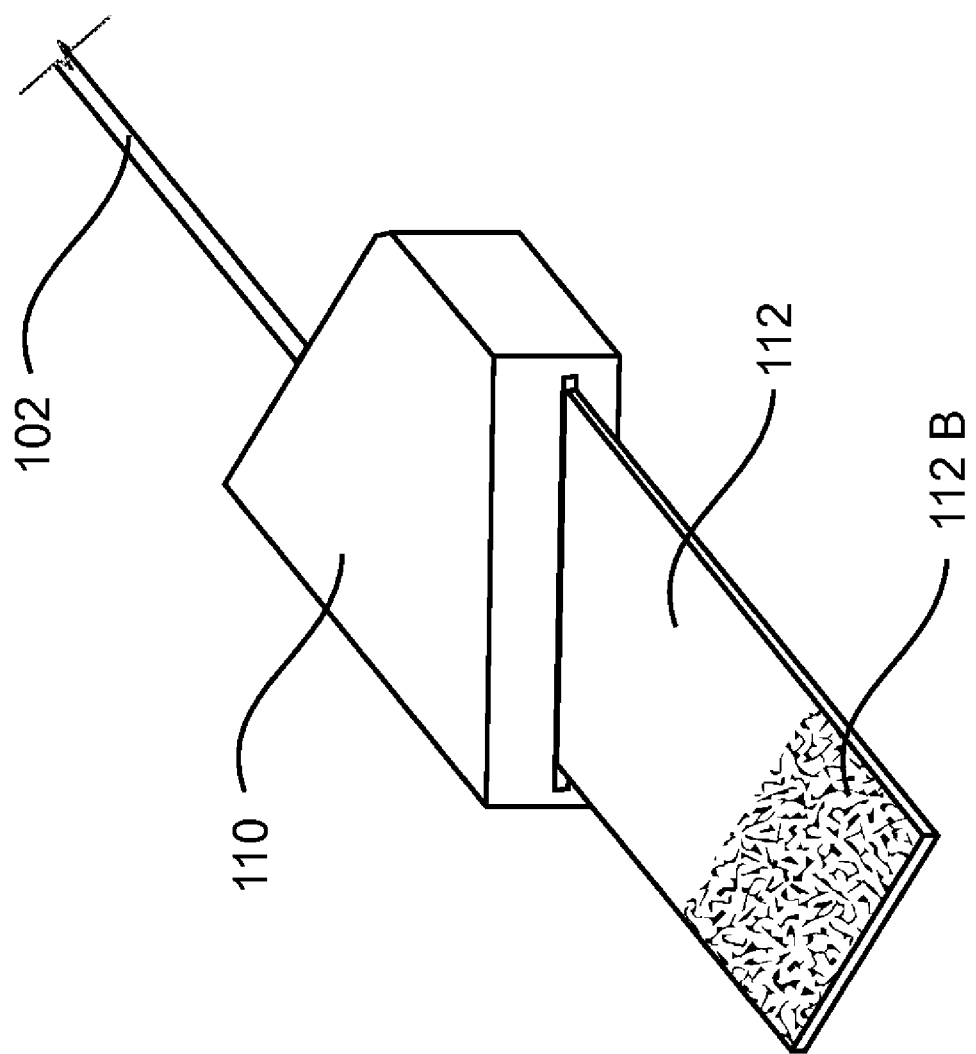
FIG. 9 is perspective view of the standard flag post as previously described

FIG. 9 is perspective view of the standard flag post. In the embodiment of FIG. 8, flag post design 112 may be attached to dock 110 and may be provided with a reusable glue 112B as discussed above. Non-marring, re-usable glue 11@B may enable a user to anchor the head 110 to a wall or other surface. Dock 110 is coupled to wire 102 as in previous Figures. Flag post 112 may be renewed with additional glue surfaces, which may be stuck onto flag post 112, as previously discussed. Alternatively, flag post 112 may be made disposable and thus discarded once the glue 112B no longer is useful.

Figure 10:
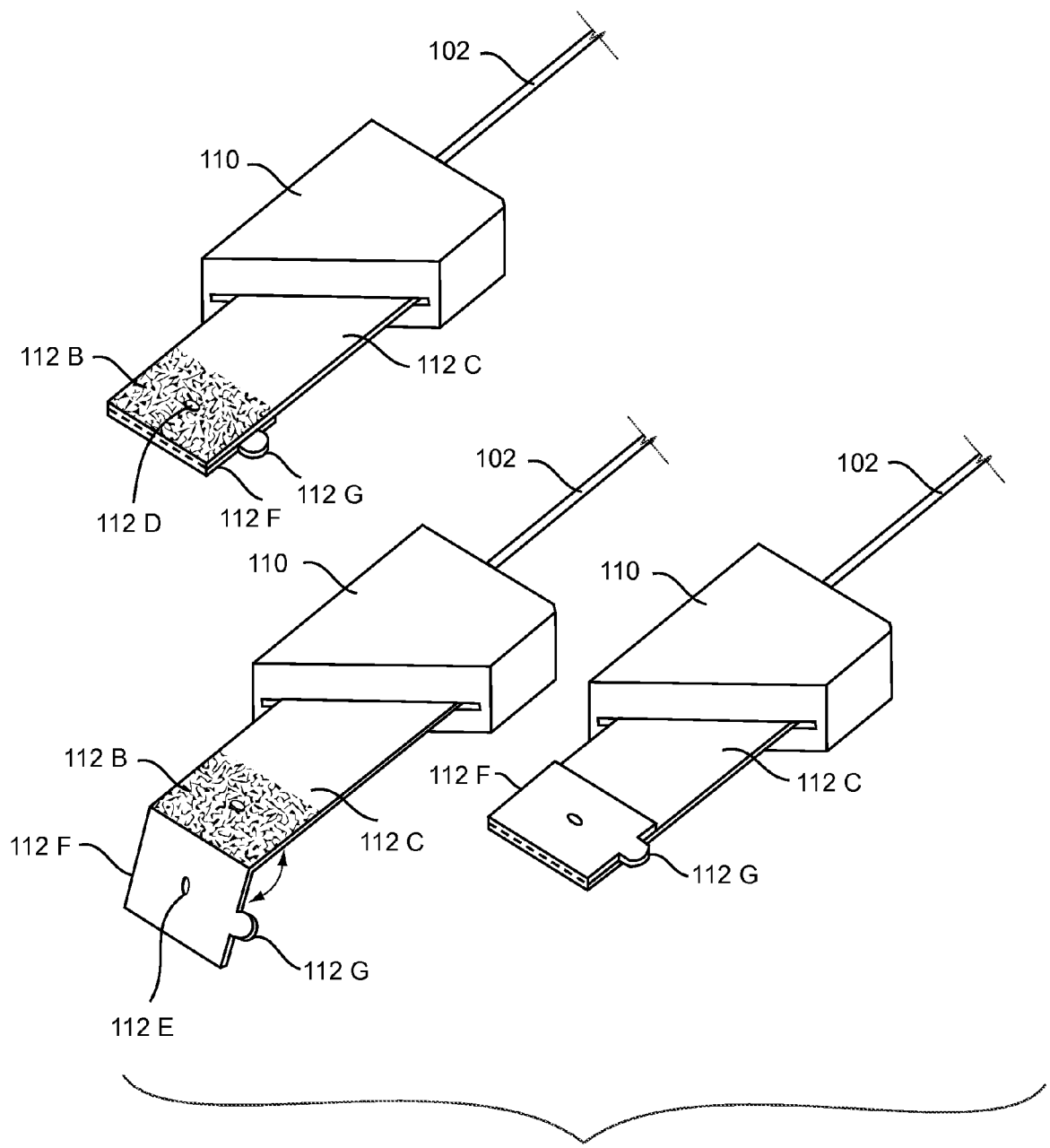
FIG. 10 shows three perspective views of another version of the flag post that adds a locking flap that exposes non-marring, re-usable glue.

FIG. 10 is a perspective view of another version of the flag post 112 that adds a locking flap 112F that exposes non-marring, re-usable glue. In the embodiment of FIG. 10, flag post design 112C include a hinge flap 112F that exposes non-marring, re-usable glue 112B that enables the user to anchor the head to a wall or other surface. Dock 110 is coupled to wire 102 as in previous Figures. Hinged portion 112F may cover glue portion 112B to preserve glue portion 112B from becoming clogged with lint or dirt or the like. A tab 112G may be used to manipulate hinged portion 112F. Hole 112E may engage bump 112D to lock hinge portion 112F in a retracted position as illustrated in the left-hand portion of FIG. 10.

Figure 11:
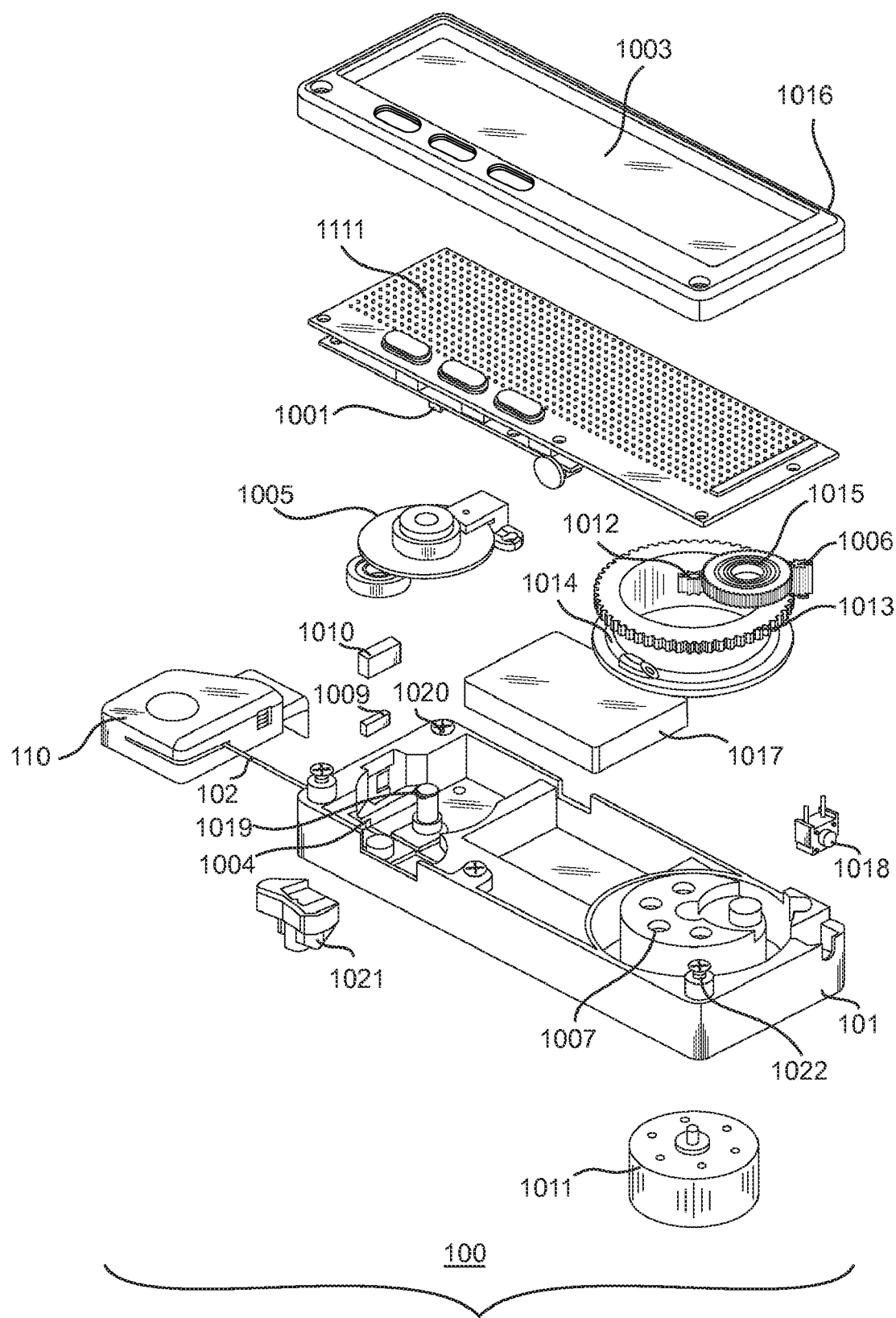
FIG. 11 is an exploded view of the preferred embodiment of the present invention as contemplated at the time of filing.

FIG. 11 is an exploded view of the preferred embodiment of the present invention as contemplated at the time of filing. In this embodiment, device 100 includes a number of components similar to those described previously and as will be described in more detail below. Device 100 comprises case 101 with cover panel 1016, which may be attached to case 101 via screws 1022 or the like. Case 101 may comprise a number of sub-components which in turn may be assembled using screws 1020 or the like. Cover panel 1016 may be provided with a transparent or translucent window 1003 to allow a user to view a display 1111 mounted on control board 1001. The display 1111 is shown in the face of control board 1001, as described previously may comprise a large format LED pixel display as initially contemplated, however in the preferred embodiment, it may comprise a backlit black and white or color LCD display, as these are coming down in price and thus more cost-effective than LED displays. In addition, an LCD display may require less power and thus extend battery life. Moreover, such LCD displays may more readily display graphics and images, including photographs and video and the like. In one alternative embodiment of the present invention, an inexpensive digital camera may be incorporated into the device so that snapshots or videos of various measurement features may be made and stored in the device 100 for later display on display 101.

As in previously described embodiments, device 100 may include measurement head 110 which may be coupled to the main portion of device 100 via wire 102. Wire 102 may pass through pinch roller and encoder assembly 1005. Pinch roller and encoder assembly 105 grips wire 102 using a pair of pinch rollers, one of which is coupled to an optical encoder wheel and optical pickup as shown in more detail in FIG. 14. Optical encoder reel may rotate on shaft 1019 and be secured in place with a circlip or the like. As wire 102 is fed in and out of case 101 through slot 1004 of device 100, the encoder wheel rotates, which in turn measures the length of wire 102 fed out of case 101 as will be described in more detail below.

Wire 102 may be extended and/or retracted manually and/or electrically, using electric motor 1011, which may comprise a Jamco RF-100CA-11 400-R compact electric motor. Motor 1011 may drive pinion gear 1012 which in turn may drive intermediate gear 1015, which in turn drives secondary pinion gear 1006 which in turn drives ring gear 1013 and spool 1014. Spool 1014 may rotate on hub 1007 and coils up wire 102 when it is retracted into device 100. In a preferred embodiment, wire 102 may be extended manually (by pulling on head 110 in the traditional manner of a measuring tape) and then electrically retracted using motor 1011 and the gear train described herein. Alternately, a coiled spring mechanism may be used to retract wire 102, as with a traditional tape measure. However, the use of an electric motor allows for more uniform retraction and thus more uniform measurement by the encoder 1005.

Note also that by using a stepper motor or the like, measurement by encoder 1005 may be verified by calculating the amount of wire retracted as a function of motor revolutions, which in turn yields ring gear and spool revolutions when multiplied by the reduction of the various gear train components. In yet another alternate embodiment, encoder 1005 may be dispensed with entirely and measurement performed by counting motor revolutions alone.

Toggle line lock 1021 may be provided to lock wire 102 in place during measurement. Toggle line lock 1021 may comprise a simple mechanical clamp which also may activate an electrical switch (not shown) to prevent motor 1011 from engaging while wire 102 is in a locked position. Head 110 may retract to case 101 of device 100 and remain attached to case 101 via magnet 1009. Contact 1010 may determine when head 110 is in contact with case 101 and be used to calibrate the zero position for measurement. Battery 1017 may comprise a rechargeable lithium-ion battery or the like, such as commonly used in cellphones or the like. In the preferred embodiment, the battery may comprise a 500 mAH Powerstream brand battery, model GM652535 or the like. Microswitch 1018 may be used to reset or reboot the device or switch power on and off.

FIG. 12 is an exploded view of the head 110 of FIG. 11. Referring to FIG. 12, head 110 may comprise a number of components, including dock base bottom 1303 which accepts wire 102, which captures cable ball shank fitting 1302 in a suitable slots formed on dock base bottom 1303. Cable ball shank fitting 1302 may comprise, for example a Lexco model CO12036B ball shank fitting or the like. Dock base top 1309 may attach to dock base bottom 1303 via screws 1308 or the like (or adhesive) thus locking in ball shank fitting 1302.

Female contact 1306 may be provided on head 100 to connect electrically the main portion of the unit 100 as illustrated in FIG. 11. Magnet 1304 may interact with the magnet 1009 of FIG. 12 to attach head 110 to case 101 when cable 102 is retracted and also insure electrical contacts between contact 1306 of FIG. 12 with contact 1010 of FIG. 11. Post 1305, here illustrated as an angle post, may attach to head base 1303 and snap in place or be secured by magnets or the like. Resistor 1307 may be mounted in the post and be used to indicate to the device 100 what type of post has been inserted into head 110. Resistor 1307 may comprise, for example, a 1.1K 1210 Digikey model 541.1KVCT-ND resistor which provides a resistance value which may be read electronically to indicate what type of post is attached to the head. In this manner, the various posts of FIG. 5 may be attached to head 110 and the device can determine how to alter measurement values accordingly, if necessary, to compensate for the post type.

FIG. 13 is an exploded view of individual components of the apparatus of FIG. 11. Referring to FIG. 13, the pinch roller and encoder unit 1005 of FIG. 12 may include two rollers 1502, of which one is shown in the drawing. These rollers may ride on wire 102 of FIG. 12 using suitable friction to force rollers 1502 against wire 102 when it is passing between them. One of rollers 1502 may be coupled to encoder wheel 1503 which may comprise an AVAGO model HEDS-5120 encoder wheel or the like, which may be optically or magnetically encoded, or the like. Encoder 1501 may comprise an AVAGO HEDS encoder or the like and may generate a pulse signal or the like when encoder wheel 1503 rotates, as is known in the art.

FIG. 13 also illustrates the processor board 1401, which may include a suitable microprocessor known in the art, programmed to perform the functions described herein. Processor board may include a number of switches 1403 to activate various functions. USB port 1404 may comprise a Hirose UX60 USB (Universal Serial Bus) jack, and allow the device to communicate with other devices or a personal computer or the like. Various buttons, such as ON button 1405, or ENTER button 1408, MENU bottom 1609, ORIGIN button 1607, or ARROW button 1602 may be mounted to the case and interact with switches 1403.

As previously noted, in one embodiment, once unwound and extended out of unit, the wire/material may be stiff enough stay straight for as many as six feet while extending. A number of embodiments may be employed to achieve this feature. In one embodiment, a flat substrate creases as extended. In another embodiment, a thin tape may be used with the substrate arced/curved similar to Prior Art tape measures. Two different substrates (each flexible on their own) laminate or adhere together as exiting the device making the wire stiff. In another embodiment, as the wire extends, a low charge is applied to the wire causing it to stiffen. In yet another embodiment, a technique called the wooden snake method is used. A wooden snake is a child's toy comprised of several wooden sections which link to each other with a hinge. When held one way, the toy droops down. When rotated 90°, the toy flexes parallel to the floor but does not droop. This same type of technology may be applied to all or a portion of the wire on a nano scale to allow the wire to remain rigid, at least for the first few feet.

The mechanics of measuring using the wire may comprise one or more of a number of techniques. In one embodiment internal rollers, which press tightly against wire, may rotate as the wire passes between them. The wire has a "tooth" or texture which help the rollers grab the wire to prevent slippage. The rollers, coupled to a shaft encoder (magnetic, optical, or the like) then feed data feed to the internal microprocessor, which calculates distance. In another embodiment, a delineated spool may be used. Marks on an internal wire spool (optical, magnetic) may be read/scanned by a sensor and then transmitted to the microprocessor to determine measurement. Such a technique requires that the wire wind evenly along the spool, or that the spool measurements compensate for any wire overlap. In another embodiment, a delineated wire may be used. The wire may be printed or etched with special markings and scanned. The marking may or may not be visible to the naked eye. As the wire spools out, the markings are scanned by an optical or other scanner and the signal sent to the microprocessor, which calculates distance.

In another embodiment, the wire itself may be encoded. The wire has information encoded on it. This embodiment may take two forms. In a first, information is hard encoded on the wire—each data point is a specific measure and has a specific value. In a second embodiment, soft encoding is used—each data point is always "x" amount from previous point so even if wire does distort, the measurement is always accurate due to a fixed zero point.

In another embodiment, a nano scale cog and sprocket may be employed to measure distance of unspooled wire. As noted above, other wire measurements may also be used. For example, physical properties of the wire (resistance, inductance) may be measured, which will increase with length. RF or other wireless techniques may be used to bounce a signal from the DMD unit to the dock and back, and measure the speed of propagation, which will vary with length.

In addition to the features described above, other features may be added to the present invention as accessory items, optional features, or upgrades for different model lines. Such features may include a compass to allow a user to locate North. Such a compass may be electrical in nature, use GPS technologies, or may be a simple magnetic compass. An angle finder may be used to calculate angles. As the wire extends from the unit, it can calculate the degree of the angle the wire is relative to the body of the unit. An auto blueprint creation feature may take a saved set of measurements and automatically generate a blueprint-like drawing when imported into architectural type computer applications.

In another feature, a user measures a room in a clockwise rotation, specifying which are inside or outside corners or ceiling, then saves the group of measurements. These measurements may be used by a script/program to essentially draw out the floor plan. It may then instantly calculate area and/or volume bypassing a menu driven process. It may then the transfer (display) those measurements and/or /floor plans into 2D or 3D renderings. If there are multiple options for a particular set of measurements, it may then present the user those options when connecting to a display. In another feature, the apparatus may include a scaling function. If, for example, an architect is using the Flag Post on a blueprint, he can set the DMD to calculate ¼" equals 1 ft. So as he measures on the blueprint, the unit will display the measurements in feet/inches.

While the preferred embodiment and various alternative embodiments of the invention have been disclosed and described in detail herein, it may be apparent to those skilled in the art that various changes in form and detail may be made therein without departing from the spirit and scope thereof.

I claim:

1. A digital measuring device, comprising:
a case containing components of the digital measuring device;
a measuring wire extending from an opening in the case, the measuring wire extending from and retracting into the case to measure distance as a function of length of the wire extended from the case;
a spool, provided in the case, winding the wire when retracted into the case;
a head; attached to one end of the wire extended from the case, the head indicating an end point for measurement;
a display, on the case, for displaying a digital readout of length of the measuring wire extended from the case as an indication of distance measured; and
a removable head end, removably attachable to the head, the removable head end configured to indicate an end point for measurement for a particular application,
wherein the removable head further comprises:
a flag head having a translucent, flexible piece of material allowing the user to see through the material to indicate an end point for measurement for a particular application,
wherein the flag head further comprises:
a reusable stick back on the translucent, flexible piece of material to removably adhere the flag head post with reusable stick back onto a surface.

2. A digital measuring device, comprising:
a case containing components of the digital measuring device;
a measuring wire extending from an opening in the case, the measuring wire extending from and retracting into the case to measure distance as a function of length of the wire extended from the case;
a spool, provided in the case, winding the wire when retracted into the case;
a head; attached to one end of the wire extended from the case, the head indicating an end point for measurement;
a display, on the case, for displaying a digital readout of length of the measuring wire extended from the case as an indication of distance measured; and
a removable head end, removably attachable to the head, the removable head end configured to indicate an end point for measurement for a particular application,
wherein the removable head further comprises:
a measuring wheel attaching to the head and communicating with the digital measuring device to communicate revolutions of the measuring wheel to the digital measuring device, the digital measuring device displaying distance as a function of revolutions of the measuring wheel.

3. A digital measuring device, comprising:
a case containing components of the digital measuring device;
a measuring wire extending from an opening in the case, the measuring wire extending from and retracting into the case to measure distance as a function of length of the wire extended from the case;
a spool, provided in the case, winding the wire when retracted into the case;
a head; attached to one end of the wire extended from the case, the head indicating an end point for measurement;
a display, on the case, for displaying a digital readout of length of the measuring wire extended from the case as an indication of distance measured; and
a removable head end, removably attachable to the head, the removable head end configured to indicate an end point for measurement for a particular application,
wherein the removable head further comprises:
a micrometer head attached to the head and communicating electronically with the digital measuring device, the micrometer head measuring micrometer dimensions electronically and communicating such measurements to the digital measuring device for storage in the digital measuring device and display on the display of the digital measuring device.

4. A digital measuring device, comprising:
a case containing components of the digital measuring device;

a measuring wire extending from an opening in the case, the measuring wire extending from and retracting into the case to measure distance as a function of length of the wire extended from the case;

a spool, provided in the case, winding the wire when retracted into the case;

a head; attached to one end of the wire extended from the case, the head indicating an end point for measurement;

a display, on the case, for displaying a digital readout of length of the measuring wire extended from the case as an indication of distance measured; and a removable head end, removably attachable to the head, the removable head end configured to indicate an end point for measurement for a particular application, wherein the removable head further comprises:

a coded resistor identifying removable head type, the digital measuring device determining the coded resistor and determining removable head type and determining measurement based on amount of wire extended from the case and removable head type.

5. A digital measuring device, comprising:

a case containing components of the digital measuring device;

a measuring wire extending from an opening in the case, the measuring wire extending from and retracting into the case to measure distance as a function of length of the wire extended from the case;

a spool, provided in the case, winding the wire when retracted into the case;

a head; attached to one end of the wire extended from the case, the head indicating an end point for measurement;

a display, on the case, for displaying a digital readout of length of the measuring wire extended from the case as an indication of distance measured;

a removable head end, removably attachable to the head, the removable head end configured to indicate an end point for measurement for a particular application;

a motor, attached to the spool and rotating the spool to selectively extend and retract the wire through the opening in the case; and an error detector detecting movement of the wire from the case when not powered by the motor, and generating an error message if the wire has been manually extended.

6. The digital measuring device of claim 5, wherein the removable head end further comprises:

a right angle head having an angled tab hooked over the edge of any rigid surface to indicate an end point for measurement for a particular application.

7. The digital measuring device of claim 5, wherein the removable head further comprises:

a flag head having a translucent, flexible piece of material allowing the user to see through the material to indicate an end point for measurement for a particular application.

8. The digital measuring device of claim 5, wherein the removable head further comprises:

a stickie head, having a reusable stick back to removably adhere the head with reusable stick back onto a surface to indicate an end point for measurement for a particular application.

9. The digital measuring device of claim 5, wherein the removable head further comprises:

a magnet head having a magnet attaching the head to any ferrous magnetic surface for measurement to indicate an end point for measurement for a particular application.

10. The digital measuring device of claim 5, wherein the removable head further comprises:

a hook head having a hook end to indicate an end point for measurement for a particular application.

11. The digital measuring device of claim 5, wherein the removable head further comprises:

a pin head having a metal pin to stick into material to indicate an end point for measurement for a particular application.

12. The digital measuring device of claim 5, wherein the removable head further comprises:

a stake pin driven into soil, and provided with a 360-degree swivel for the wire to allow measurement in multiple directions, to indicate an end point for measurement for a particular application.

13. The digital measuring device of claim 5, further comprising:

a processor for calculating length of wire extended from the case;

a memory, for storing measurements made with the digital measuring device;

a plurality of function keys, coupled to the processor, which, when pressed, perform one or more functions of storing measurements, adding measurements, multiplying measurements, and subtracting measurements, and an external interface, coupled to the processor for inputting and outputting measurement data.

14. The digital measuring device of claim 13, further comprising:

a pinch roller, rolling against the wire and rotating when the wire is extended and retracted from the case; and a rotary encoder, coupled to the pinch roller, for measuring rotations of the pinch roller, wherein the digital measuring device calculates length of the measuring wire extended from the case as a function of rotations of the pinch roller and displays a digital readout of length of the measuring wire extended from the case as an indication of distance measured.

15. The digital measuring device of claim 13, further comprising:

an audio output, coupled to the processor, generating audio signals to a user to prompt a user to make measurements;

wherein measurement data, input to the digital measuring device through the external interface, is stored in the memory and programs the processor to generate prompts of measurement data to a user as at least one of visual data through the display and one or more audio prompts through the audio output.

16. The digital measuring device of claim 15, further comprising:

an audio input, coupled to the processor, for receiving audio voice commands from a user and storing audio voice commands from the user in the memory and associating recorded voice commands in the memory with corresponding measurements made with the digital measuring device.

17. The digital measuring device of claim 16, wherein the processor recognizes audio voice commands and in response to recognized audio voice commands perform one or more functions of storing measurements, adding measurements, multiplying measurements, and subtracting measurements.

18. The digital measuring device of claim 15, where in the construction data comprises at least one of, building plan data, lumber dimensional data, materials and supplies data, and assembly instruction data.

* * * * *